(12) United States Patent
Kim et al.

(10) Patent No.: US 8,023,447 B2
(45) Date of Patent: Sep. 20, 2011

(54) METHOD FOR DETERMINING OPTIMAL TRANSMISSION MODE AND FRAME STRUCTURE FOR MODE DETERMINATION IN RELAY SYSTEM

(75) Inventors: Young-Doo Kim, Suwon-si (KR); Eung Sun Kim, Suwon-si (KR); Tae Soo Kwon, Hwaseung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 964 days.

(21) Appl. No.: 11/937,615

(22) Filed: Nov. 9, 2007

(65) Prior Publication Data

US 2009/0016256 A1 Jan. 15, 2009

(30) Foreign Application Priority Data

Jul. 11, 2007 (KR) .................. 10-2007-0069603

(51) Int. Cl.
*H04B 7/14* (2006.01)
(52) U.S. Cl. ........................................ 370/315
(58) Field of Classification Search .............. 370/315, 370/316, 203, 208, 252, 465, 320, 329, 331, 370/335, 341, 342, 338, 356, 209; 455/7, 455/63.1
See application file for complete search history.

(56) References Cited

U.S. PATENT DOCUMENTS

| | | | |
|---|---|---|---|
| 6,728,233 B1 * | 4/2004 | Park et al. | ...... 370/342 |
| 7,126,996 B2 | 10/2006 | Classon et al. | |
| 7,151,948 B2 | 12/2006 | Ishii et al. | |
| 7,161,956 B2 | 1/2007 | Gollamudi et al. | |
| 7,450,549 B2 * | 11/2008 | Qian et al. | ...... 370/337 |
| 7,702,280 B2 * | 4/2010 | Takeda et al. | ...... 455/7 |
| 2003/0228850 A1 | 12/2003 | Hwang | |
| 2004/0165552 A1 | 8/2004 | Kim | |
| 2005/0265290 A1 * | 12/2005 | Hochwald et al. | ...... 370/335 |

FOREIGN PATENT DOCUMENTS

| | | |
|---|---|---|
| JP | 2004-248210 A | 9/2004 |
| JP | 2006-352894 A | 12/2006 |
| KR | 10-2005-0049299 A | 5/2005 |
| KR | 10-2006-0078880 A | 7/2006 |
| KR | 10-2006-0132422 A | 12/2006 |
| KR | 10-2007-0035869 A | 4/2007 |

OTHER PUBLICATIONS

Tao, Zhifeng et al., "Aggregation and Concatenation in IEEE 802.16j Mobile Multihop Relay (MMR) Networks", 2007, 6 pages.

* cited by examiner

*Primary Examiner* — Chi H Pham
*Assistant Examiner* — Alexander Boakye
(74) *Attorney, Agent, or Firm* — Sughrue Mion, PLLC

(57) ABSTRACT

A method of determining an optimal transmission mode and a data frame structure for determining an optimal transmission mode in a data transmission system using a relay, are provided. Any one of a base station, a relay, and a mobile station determines an optimal transmission mode from among a plurality of transmission modes, and the base station transmits the determined optimal transmission mode by enabling the determined optimal transmission mode to be included in the system information duration of the data frame, so that the overall relay system can transmit data according to the optimal transmission mode.

25 Claims, 17 Drawing Sheets

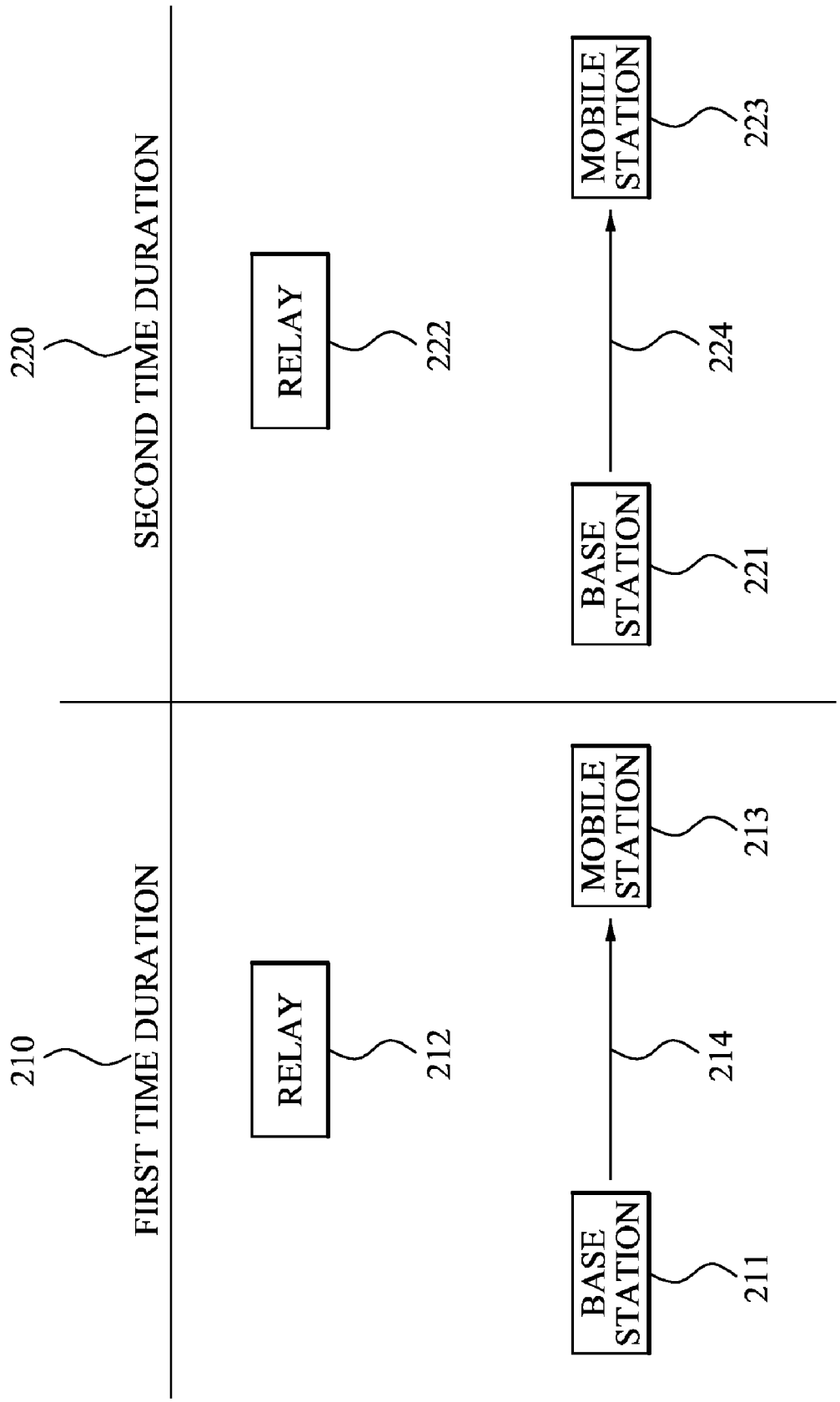

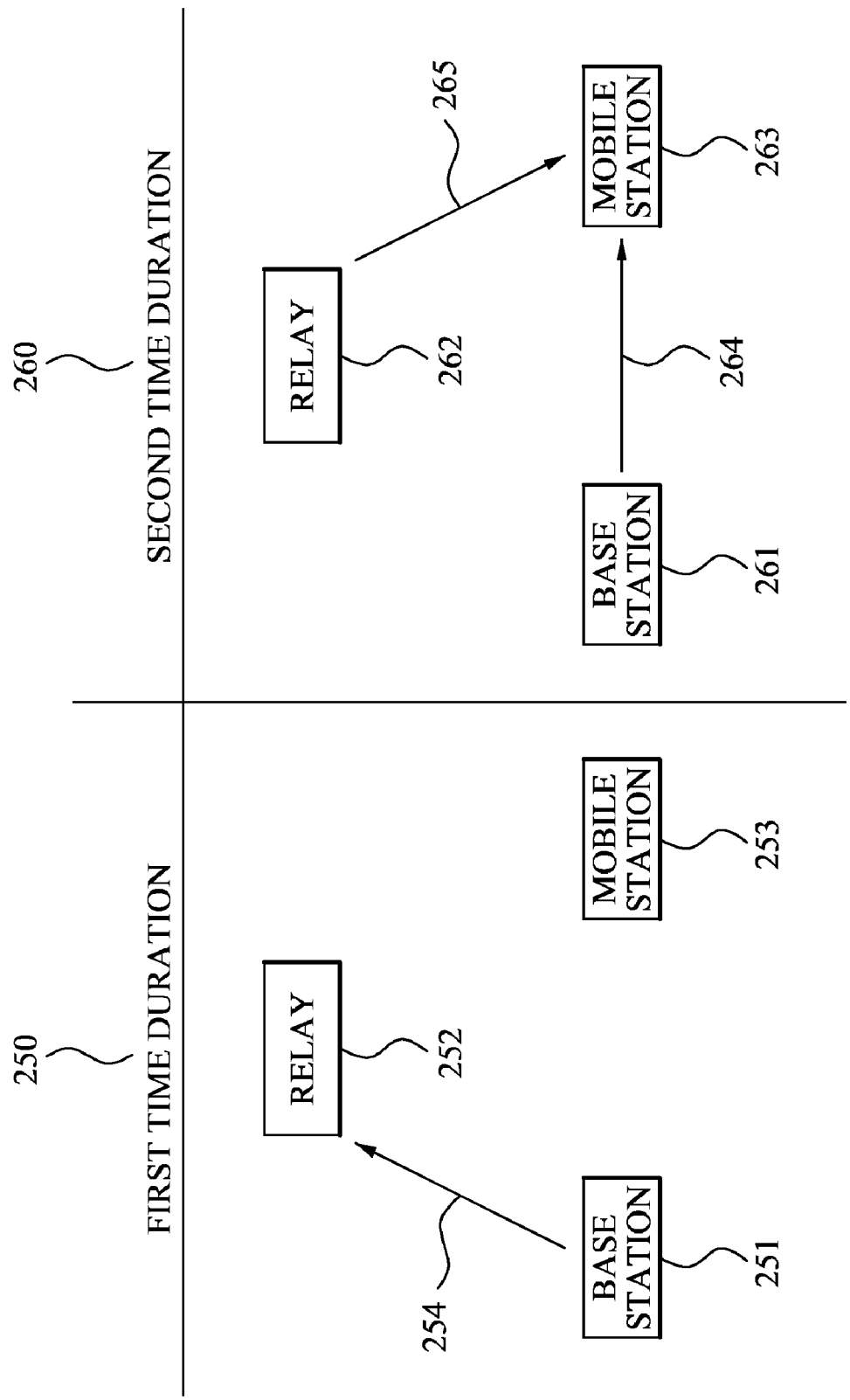

METHOD FOR DETERMINING OPTIMAL TRANSMISSION MODE AND FRAME STRUCTURE FOR MODE DETERMINATION IN RELAY SYSTEM

CROSS-REFERENCE TO RELATED APPLICATION

This application claims the benefit of Korean Patent Application No. 10-2007-0069603, filed on Jul. 11, 2007, in the Korean Intellectual Property Office, the disclosure of which is incorporated herein by reference.

BACKGROUND OF THE INVENTION

1. Field of the Invention

The present invention relates to a method of transmitting data using a relay, and more particularly, to a signaling method of determining an optimal transmission mode using a relay, and a frame structure for determining an optimal transmission mode using a relay.

2. Description of Related Art

With the development of wireless communication networks, various communication services such as simple voice communication, data transmission for video conferencing, and the like, based on wireless technologies have been gradually introduced.

The communication quality of a digital communication system is controlled in accordance with a ratio of the strength of a transmitted data signal to the strength of an interference signal and noise. However, the strength of the transmitted data signal deteriorates over time due to wireless channel characteristics. Thus, in a conventional mobile communication technology, a wireless terminal using a specific communication service cannot ensure its communication quality due to a fading phenomenon where a wireless channel varies over time.

In this regard, a scheme in which a predetermined Signal to Interference and Noise Ratio (SNIR) value is set, and the strength of a transmitted data signal is controlled based on the set value has been suggested. However, in the case where the wireless channel varies rapidly, the scheme cannot ensure communication quality.

In order to overcome the above-mentioned fading phenomenon, various diversity schemes have been used. In particular, a space diversity scheme for transceiving data using a plurality of antennas placed apart spatially from one another has been widely used as a simple scheme that is effective for overcoming the fading phenomenon.

The space diversity scheme may be used for the case in which a relatively larger space where antennas are installed is provided, such as a base station or an access point; however, it cannot be used in the case where a relatively smaller space in which antennas are installed is provided, such as a terminal.

Therefore, for overcoming the above-mentioned shortcoming, a data transceiving method using a relay has been proposed. This method is performed such that a relay receives data from a base station and forwards the received data to a terminal, and the terminal receives the data via a path having a relatively superior channel state, which corresponds to either a path from a base station to a terminal or a path from a relay to a terminal.

However, in the data transceiving method, a specific signaling process and data frame structure for determining an optimal path from among paths connecting the base station, the relay, and the terminal with one another have not been suggested, and thus a problem in substantially transmitting data arises.

SUMMARY OF THE INVENTION

An aspect of the present invention provides a method of determining, by a mobile station, an optimal transmission mode in a data transmission system using a relay.

An aspect of the present invention provides a method of determining, by a relay, an optimal transmission mode in a data transmission system using a relay.

An aspect of the present invention provides a method of determining, by a base station, an optimal transmission mode in a data transmission scheme using a relay.

An aspect of the present invention also provides a method of receiving data using a frame structure for determining an optimal transmission mode in a data receiving system using a relay.

An aspect of the present invention also provides a method of forwarding data using a frame structure for determining an optimal transmission mode in a data forwarding system using a relay.

An aspect of the present invention also provides a method of transmitting data using a frame structure for determining an optimal transmission mode in a data transmission system using a relay.

According to an aspect of the present invention, there is provided a method of determining, by a mobile station, an optimal transmission mode for transmitting data from a base station to the mobile station, the method comprising generating first channel state information with respect to a path from the base station to the mobile station; generating second channel state information with respect to a path from a relay to the mobile station; receiving third channel state information with respect to a path from the base station to the relay; and determining an optimal transmission mode from among a plurality of transmission modes based on the first channel state information, the second channel state information, and the third channel state information.

According to an aspect of the present invention, there is provided a method of determining, by a relay, an optimal transmission mode for transmitting data from a base station to a mobile station, the method comprising receiving, from the mobile station, first channel state information with respect to a path from the base station to the mobile station; receiving, from the mobile station, second channel state information with respect to a path from the relay to the mobile station; generating third channel state information with respect to a path from the base station to the relay; determining an optimal transmission mode from among a plurality of transmission modes based on the first channel state information, the second channel state information, and the third channel state information; and transmitting the determined optimal transmission mode to the base station.

According to another aspect of the present invention, there is provided a method of receiving, by a mobile station, data from a base station via a relay, the method comprising receiving, from the base station, an optimal transmission mode determined from among a plurality of transmission modes; and receiving a first data frame utilizing the received optimal transmission mode, wherein the plurality of transmission modes comprises at least one of: a first mode which directly transmits all data from the base station to the mobile station; a second mode which directly transmits all the data from the base station to the mobile station, and also transmits all the data from the base station to the mobile station via the relay;

and a third mode which directly transmits a certain portion of all the data from the base station to the mobile station, and transmits remaining data from the base station to the mobile station via the relay, wherein when the received optimal transmission mode corresponds to either the second mode or the third mode, the method further comprises receiving reception time duration information associated with the received optimal transmission mode, and the receiving of the first data frame receives the first data frame from the relay or the base station based on the received reception time duration information.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIGS. 2A, 2B, and 2C are diagrams illustrating a plurality of transmission modes of a relay system according to an exemplary embodiment of the present invention;

DETAILED DESCRIPTION OF EXEMPLARY EMBODIMENTS

Figure 1:
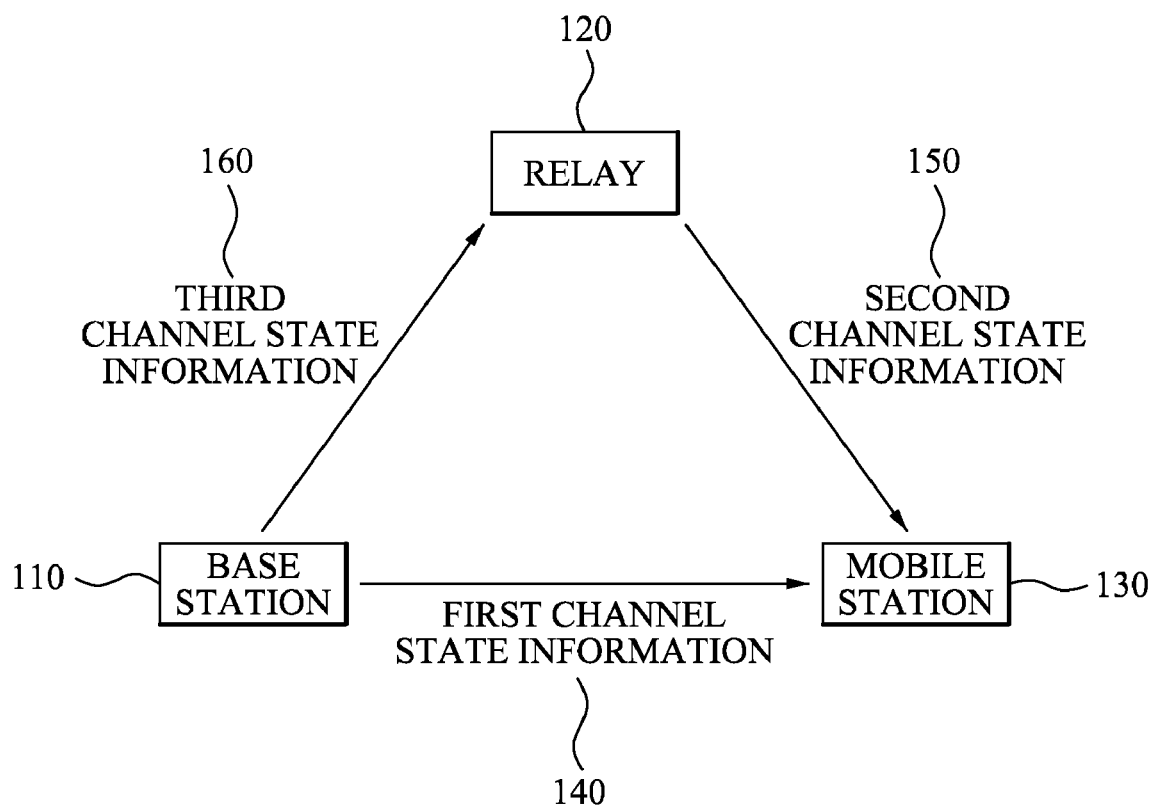
FIG. 1 is a diagram illustrating a relay system according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a relay system according to an exemplary embodiment of the present invention. As illustrated in FIG. 1, a system for transmitting data using a relay includes a base station 110, a relay 120, and a mobile station 130. Hereinafter, functions for the above respective components will be described in detail with reference to FIG. 1.

The base station 110 directly transmits data from the base station 110 to the mobile station 130 according to an optimal transmission mode having been determined in advance, or transmits data from the base station 110 to the mobile station 130 via the relay 120. According to the optimal transmission mode, the mobile station 130 receives identical data from the base station 110 and the relay 120, respectively, for an identical time period, or receives data different from each other from the base station 110 and the relay 120, respectively, for an identical time period.

The relay 120 receives an optimal transmission mode having been determined in advance, from the base station 110, and transmits data received from the base station 110 to the mobile station 130 according to the received optimal transmission mode. At this time, the relay 120 does not have any function in transmitting data according to the transmission mode. The relay 120 of the present exemplary embodiment of the invention may be a structure that is fixedly installed to improve performance of a communication system by a communication enterprise. Alternatively, the relay 120 may be a typical user's mobile station that receives data from the base station 110, and forwards the received data to another user's mobile station in order to promote communication of the other user's mobile station.

The mobile station 130 receives, from the base station 110, an optimal transmission mode having been predetermined in advance, and receives data from the base station 110 according to the received optimal transmission mode. According to the transmission mode, the mobile station 130 may directly receive data from the base station 110, or receive data via the relay 120. Even when receiving data via the relay 120, the mobile station 130 may receive identical data from the base station 110 and the relay 120, respectively, for an identical time period, or receive different data.

In a data transmission system using the relay 120, an optimal transmission mode may be determined in consideration of first channel state information 140 with respect to a path from the base station 110 to the mobile station 130, second channel state information 150 with respect to a path from the relay 120 to the mobile station 130, and third channel state information 160 with respect to a path from the base station 110 to the relay 120.

According to the present exemplary embodiment of the invention, the base station may determine the optimal transmission mode. However, according to another embodiment of the invention, the relay or the mobile station may determine the optimal transmission mode.

FIG. 2A is a diagram illustrating a first transmission mode in a relay system according to an exemplary embodiment of the present invention. In the first transmission mode, data is transmitted via the same path during a first time duration 210 and a second time duration 220. Hereinafter, a data transmission method of the first transmission mode will be described in detail with reference to FIG. 2A.

During the first time duration 210, a base station 211 directly transmits data to a mobile station 213, that is, the data is not sent through a relay 212. In the case of having a superior channel state with respect to the path from the base station 211 to the mobile station 213, the first transmission mode for directly transmitting data from the base station 211 to the mobile station 213 may be determined as an optimal transmission mode having relatively higher data transmission efficiency.

Also, in the first transmission mode, the base station 211 directly transmits data to the mobile station 213 without sending data through the relay 212, even during the second time duration 220.

According to the present exemplary embodiment of the invention, any one of the base station 221, the relay 222, and the mobile station 223 may determine the first transmission mode from among a plurality of transmission modes as an optimal transmission mode in consideration of first channel state information with respect to the path 224 from the base station 221 to the mobile station 223, second channel state information with respect to the path from the relay 222 to the mobile station 223, and third channel state information with respect to the path from the base station 221 to the relay 222.

Figure 2B:
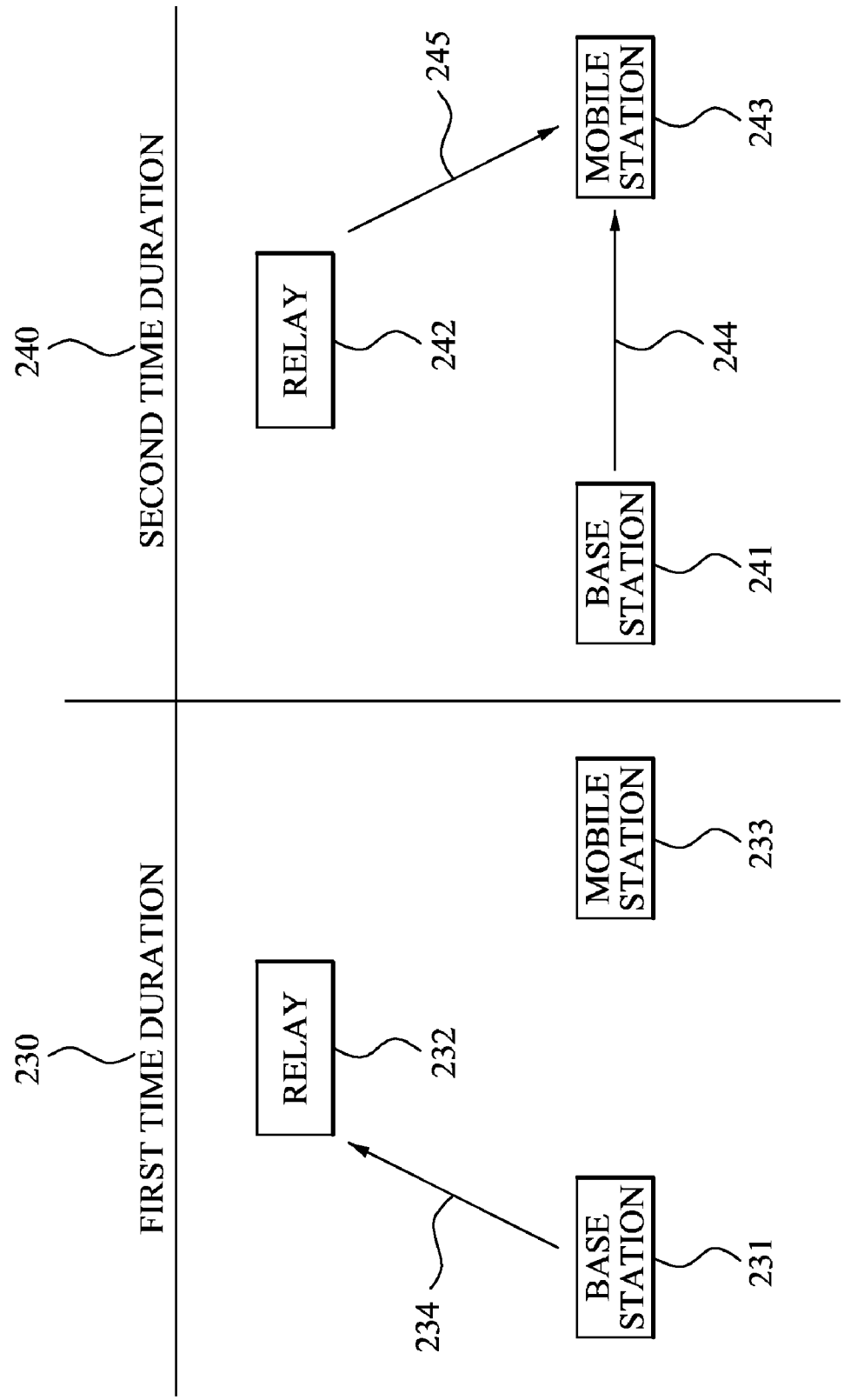

FIG. 2B is a diagram illustrating a second transmission mode in a relay system according to an exemplary embodiment of the present invention. In the second transmission mode, data is transmitted via paths different from each other during a first time duration 230 and a second time duration 240. Hereinafter, a data transmission method of the second transmission mode will be described in detail with reference to FIG. 2B.

During the second time duration 240, a base station 241 transmits data to a mobile station 243. In the second transmission mode, data that is transmitted to the mobile station 243 by the base station 241 during the second time duration 240 designates all data that is required to be transmitted to the mobile station 243 by the base station 241 for a predetermined time period. Also, during the second time duration 240, a relay 242 transmits data received from the base station 231 during the first time duration 230, to the mobile station 243. Consequently, the base station 241 and the relay 242 transmit identical data to the mobile station 243 for an identical time period. When it is assumed that the base station 241 and the relay 242 are placed spatially apart from each other by a relatively great distance, a channel state of the path 244 from the base station 241 to the mobile station 243 and a channel state of the path 245 from the relay 242 to the mobile station 243 vary individually. Thus, the mobile station 243 may receive signals transmitted from the base station 241 and the relay 242 using a diversity effect.

According to the present exemplary embodiment of the invention, any one of the base station, the relay, and the mobile station may determine the second transmission mode from among a plurality of transmission modes as an optimal transmission mode in consideration of first channel state information with respect to a path 234 from the base station 231 to the relay 232, second channel state information with respect to a path 244 from the base station 241 to the mobile station 243, and third channel state information with respect to a path 245 from the relay 242 to the mobile station 243.

FIG. 2C is a diagram illustrating a third transmission mode in a relay system according to an exemplary embodiment of the present invention. In the third transmission mode, data is transmitted via paths different from each other during a first time duration 250 and a second time duration 260, respectively. Hereinafter, a data transmission method of the third transmission mode will be described in detail with reference to FIG. 2C.

During the first time duration 250, a base station 251 transmits data to a relay 252. At this time, the transmitted data designates a certain portion of the data that is required to be transmitted to a mobile station 253 by the base station 251 for a predetermined time period.

During the second time duration 260, a base station 261 transmits data to a mobile station 263. In the third transmission mode, data that is transmitted to the mobile station 263 by the base station 261 during the second time duration 260 designates the remaining data other than data transmitted during the first time duration 250 out of data that is required to be transmitted to the mobile station 263 by the base station 261 for a predetermined time period. Also, during the second time duration 260, a relay 262 transmits data received from the base station 261 during the first time duration 250, to the mobile station 263. Consequently, the base station 261 and the relay 262 respectively transmit certain portions of all the data that is required to be transmitted to the mobile station 263 by the base station 251.

According to the present exemplary embodiment of the invention, any one of the base station 261, the relay 262, and the mobile station 263 may determine the third transmission mode from among a plurality of transmission modes as an optimal transmission mode in consideration of first channel state information with respect to the path 264 from the base station 261 to the mobile station 263, second channel state information with respect to the path 265 from the relay 262 to the mobile station 263, and third channel state information with respect to the path 254 from the base station 251 to the relay 252.

Figure 3:
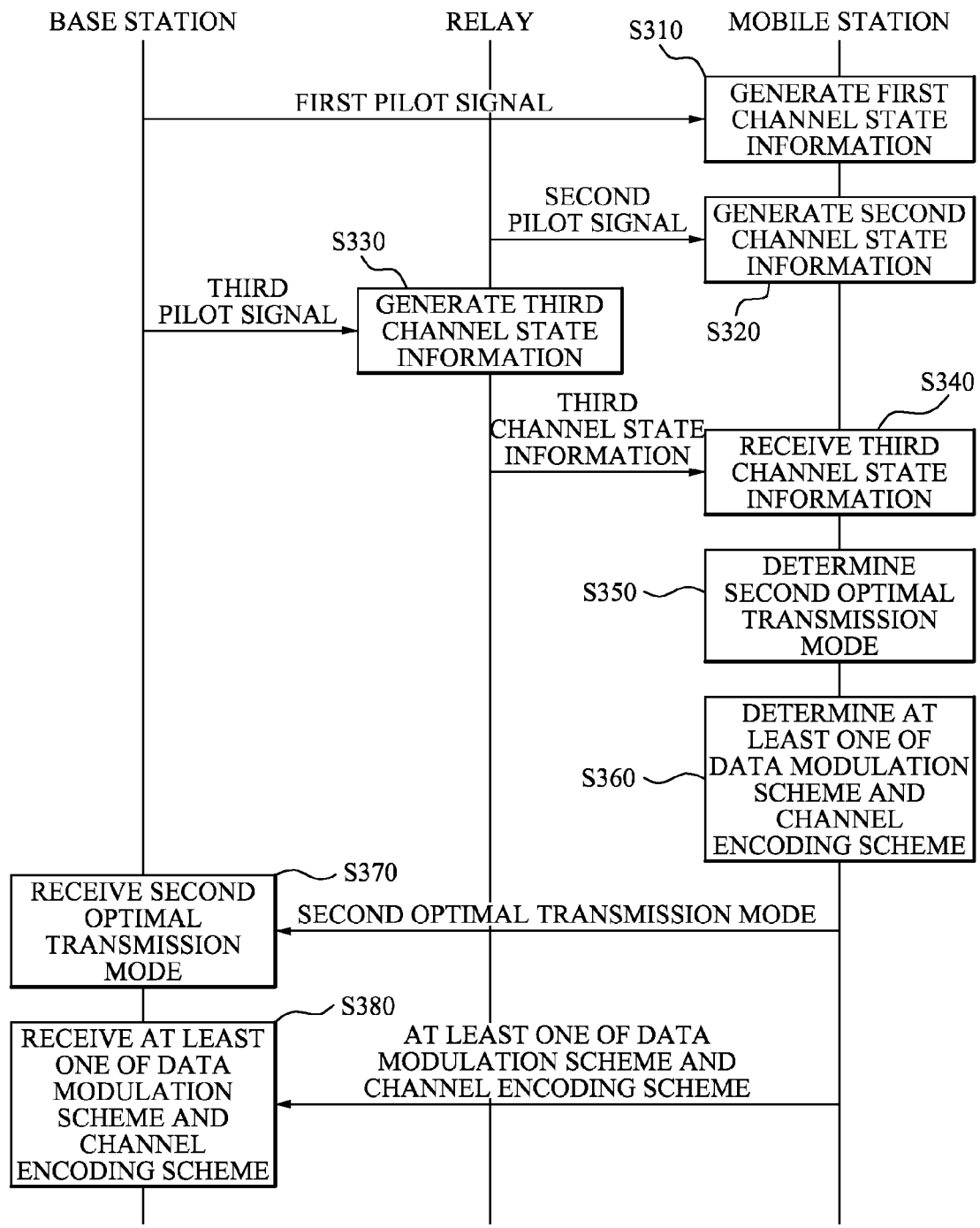
FIG. 3 is a flowchart illustrating a process where a mobile station determines an optimal transmission mode in a relay system according to an exemplary embodiment of the present invention.

FIG. 3 is a flowchart illustrating a process where a mobile station determines an optimal transmission mode in a relay system according to an exemplary embodiment of the present invention. Hereinafter, the process where the mobile station determines the optimal transmission mode will be described in detail with reference to FIG. 3.

In operation S310, the mobile station generates first channel state information with respect to a path from a base station to the mobile station. According to the present exemplary embodiment of the invention, the first channel state information may be generated based on a first pilot signal received from the base station to the mobile station.

In operation S320, the mobile station generates second channel state information with respect to a path from a relay to the mobile station. According to the present exemplary embodiment of the invention, the second channel state information may be generated based on a second pilot signal received from the relay to the mobile station.

According to the present exemplary embodiment of the invention, the first pilot signal and the second pilot signal may be orthogonal to each other. Here, we assume that the first pilot signal and the second pilot signal are orthogonal to each other. In this case, even when the first pilot signal and the second pilot signal are simultaneously received at the mobile station, the mobile station receives individually the first pilot signal and the second pilot signal. As a result, each channel state information with respect to the path from the base station to the mobile station and the path from the relay to the mobile station may be generated.

According to another embodiment of the invention, the first pilot signal and the second pilot signal may be received at the mobile station during different time periods.

In operation S330, the relay generates third channel state information with respect to a path from a base station to the relay. According to the present exemplary embodiment of the invention, the third channel state information may be generated based on a third pilot signal received from the base station to the relay.

In operation S340, the mobile station receives the third channel state information generated by the relay, from the relay.

In operation S350, the mobile station determines any one transmission mode out of a plurality of transmission modes as a second optimal transmission mode based on the first channel state information and the second channel state information generated at the mobile station, and the third channel state information received at the mobile station. According to the present exemplary embodiment of the invention, the mobile station may determine a transmission mode, in which the sum of a transmitted power at the base station and a transmitted power at the relay is at a minimum, out of the plurality of transmission modes as an optimal transmission mode. At this time, the transmitted power is required to transmit data at a predetermined data transmission rate. According to another embodiment of the invention, the mobile station may determine a transmission mode, in which data is transmitted from the base station to the mobile station at a maximum data transmission rate, out of a plurality of transmission modes as an optimal transmission mode.

According to the present exemplary embodiment of the invention, the mobile station may determine at least one of three transmission modes described in FIGS. 2A, 2B, and 2C as an optimal transmission mode.

In operation S360, the mobile station may determine a modulation scheme and a channel encoding scheme of data which are transmitted from the base station to the relay, from the base station to the mobile station, and from the relay to the mobile station, respectively. Channel states of respective paths between the base station, the mobile station, and the relay vary over time, thus an optimal modulation scheme and an optimal channel encoding scheme for the varying channel states can also vary over time. Accordingly, when the mobile state determines an optimal modulation scheme and channel encoding scheme for the respective paths in consideration of the first channel state information, the second channel state information, and the third channel state information, and then the base station and the relay channel-encodes and modulates data according to the above-determined modulation scheme and the channel encoding scheme, the relay system of the present invention may transmit data with optimal performance.

In operation S370, the mobile station transmits the above-determined optimal transmission mode to the base station. The base station receives the determined optimal transmission mode, and transmits data according to the second optimal transmission mode. Also, the base station transmits the determined optimal transmission mode to the relay, thereby allowing the relay to transmit data according to the optimal transmission mode.

In operation S380, the mobile station transmits the determined modulation scheme and the channel encoding scheme to the base station. The base station channel-encodes and modulates data referring to the determined modulation scheme and the channel encoding scheme, thereby transmitting the data to the relay and the mobile station. Also, the base station transmits the determined modulation scheme and the channel encoding scheme to the relay, thereby allowing the relay to transmit data according to the determined modulation scheme and the channel encoding scheme.

According to the present exemplary embodiment of the invention, when the mobile station determines a second optimal transmission mode of the relay system, it is no longer necessity to feed back, to either the base station or the relay, the first channel state information and the second channel state information generated at the mobile station. Therefore, an information amount to be fed back from the mobile station to either the relay or the base station can be minimized, thereby enabling embodiment of the relay system with a simple construction.

Figure 4:
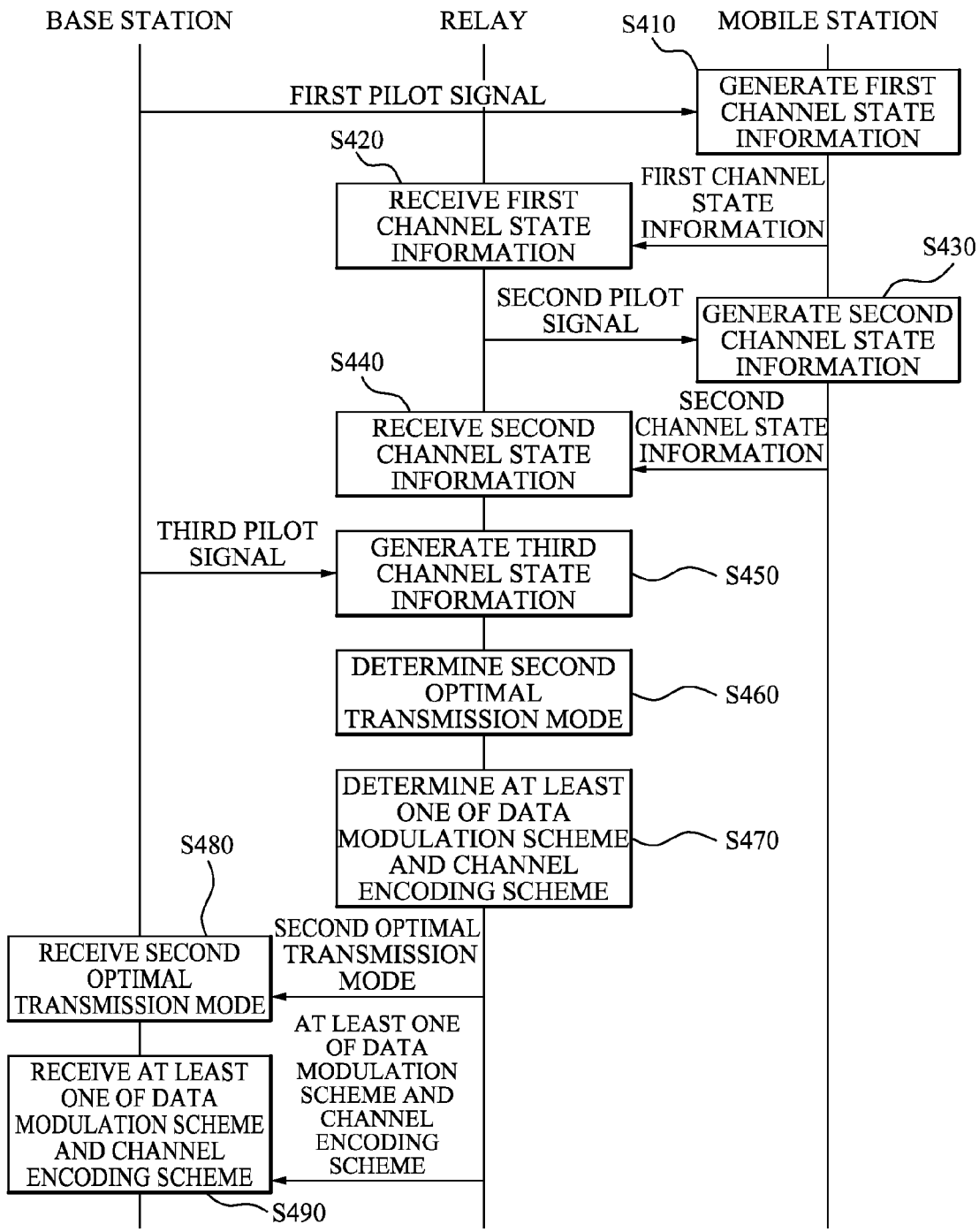
FIG. 4 is a flowchart illustrating a process where a relay determines an optimal transmission mode in a relay system according to an exemplary embodiment of the present invention.

FIG. 4 is a flowchart illustrating a process where a relay determines an optimal transmission mode in a relay system according to an exemplary embodiment of the present invention. Hereinafter, the process where the relay determines the optimal transmission mode will be described in detail with reference to FIG. 4.

In operation S410, the mobile station generates first channel state information with respect to a path from a base station to the mobile station. According to the present exemplary embodiment of the invention, the first channel state information may be generated based on a first pilot signal transmitted from the base station and received at the mobile station.

In operation S420, the relay receives the first channel state information generated by the mobile station from the mobile station.

In operation S430, the mobile station generates second channel state information with respect to a path from the relay to the mobile station. According to the present exemplary embodiment of the invention, the second channel state information may be generated based on a second pilot signal transmitted from the relay and received at the mobile station.

According to the present exemplary embodiment of the invention, the first pilot signal and the second pilot signal may be orthogonal to each other. Here, we assume that the first pilot signal and the second pilot signal are orthogonal to each other. In this case, even when the first pilot signal and the second pilot signal are simultaneously received at the mobile station, the mobile station receives individually the first pilot signal and the second pilot signal. As a result, each of the channel state information with respect to the path from the base station to the mobile station and the path from the relay to the mobile station may be generated.

According to another embodiment of the invention, the first pilot signal and the second pilot signal may be received at the mobile station during different time periods.

In operation S440, the relay receives, from the mobile station, second channel state information generated by the mobile station.

In operation S450, the relay generates third channel state information with respect to a path from the base station to the relay. According to the present exemplary embodiment of the invention, the third channel state information may be generated based on a third pilot signal transmitted from the base station and received at the relay.

In operation S460, the relay determines any one transmission mode out of a plurality of transmission modes as a second optimal transmission mode based on the first channel state information and the second channel state information received at the relay, and the third channel state information generated at the relay. According to the present exemplary embodiment of the invention, the relay may determine a transmission mode, in which the sum of a transmitted power at the base station and a transmitted power at the relay is at a minimum, out of the plurality of transmission modes as a second optimal transmission mode. At this time, the transmitted power is required to transmit data at a predetermined data transmission rate. According to another embodiment of the invention, the relay may determine a transmission mode, in which data is transmitted from the base station to the mobile station at a maximum data transmission rate, out of a plurality of transmission modes as a second optimal transmission mode.

According to the present exemplary embodiment of the invention, the relay may determine at least one of three transmission modes described in FIGS. 2A, 2B, and 2C as an optimal transmission mode.

In operation S470, the relay may determine a modulation scheme and a channel encoding scheme of data which are transmitted from the base station to the relay, from the base station to the mobile station, and from the relay to the mobile station, respectively. Channel states of respective paths between the base station, the mobile station, and the relay vary over time, thus an optimal modulation scheme and an optimal channel encoding scheme for the varying channel states can also vary over time. Accordingly, when the relay determines an optimal modulation scheme and channel encoding scheme for the respective paths in consideration of the first channel state information, the second channel state information, and the third channel state information, and then the base station and the mobile station channel-encodes, decodes, modulates, and demodulates data according to the above-determined modulation scheme and the channel encoding scheme, the relay system of the present invention may transmit data with optimal performance.

In operation S480, the relay transmits the above-determined second optimal transmission mode to the base station. The base station receives the determined optimal transmission mode, and transmits data according to the optimal transmission mode. Also, the base station transmits the determined optimal transmission mode to the mobile station, thereby allowing the mobile station to transmit data according to the optimal transmission mode.

In operation S490, the relay transmits the above-determined data modulation scheme and the channel encoding scheme to the base station. The base station channel-encodes and modulates data referring to the determined modulation scheme and the channel encoding scheme, thereby transmitting data to the relay and the mobile station. Also, the base station transmits the determined modulation scheme and the channel encoding scheme to the mobile station, thereby allowing the mobile station to appropriately receive data according to the determined modulation scheme and the channel encoding scheme.

According to the present exemplary embodiment of the invention, when the relay determines an optimal transmission mode of the relay system, a calculation process for determining the optimal transmission mode at the mobile station may be omitted. Specifically, when the mobile station determines the optimal transmission mode of the relay system, a data transmission rate or a transmission capacity at each path with respect to each transmission mode is required to be calculated. Also, since the calculations on the data transmission rate, the transmission capacity, and the like, at the mobile station operated by a battery are burdensome to be performed, a relay determining the optimal transmission mode is effective for reducing power consumption at the mobile station.

Figure 5:
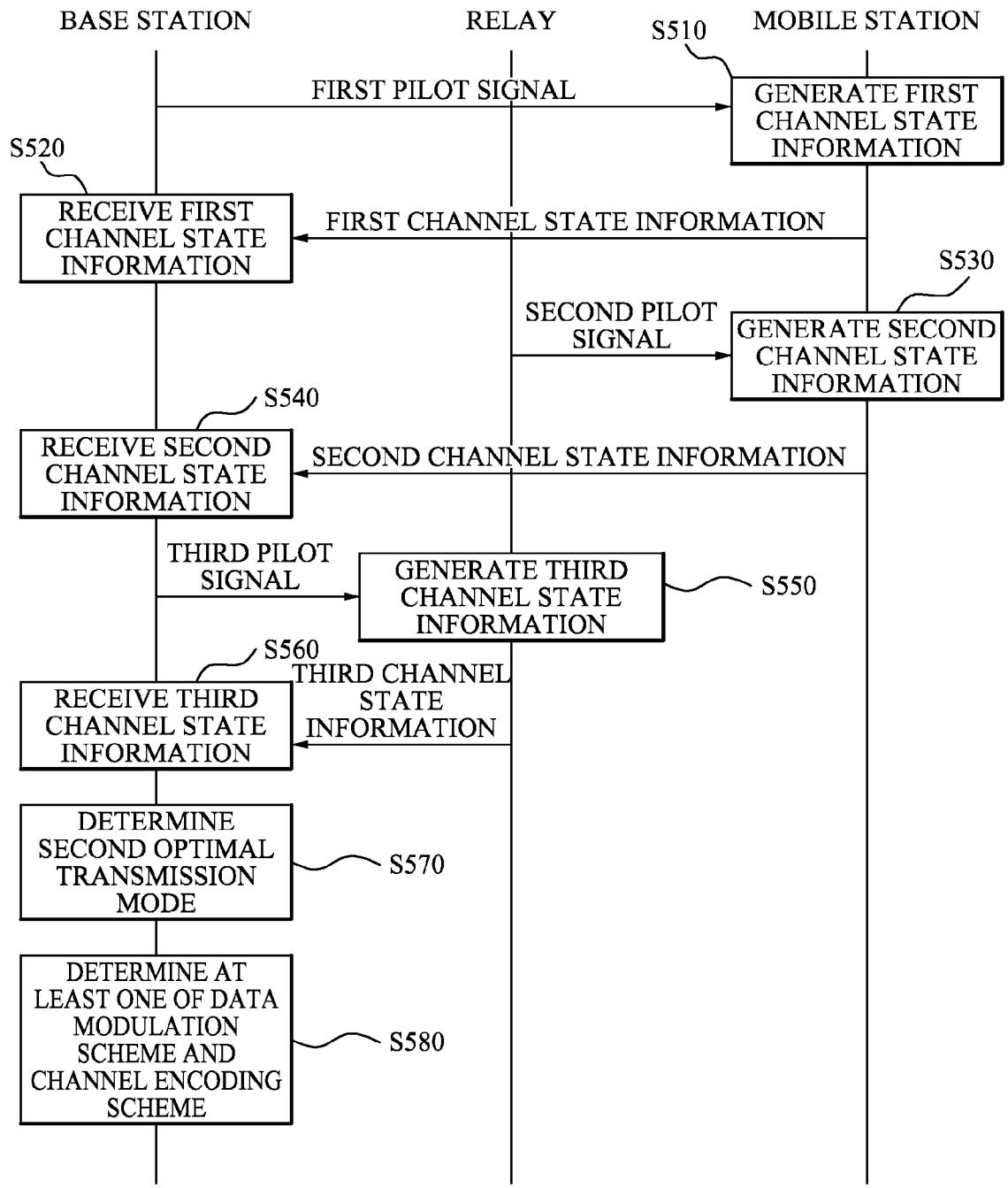
FIG. 5 is a flowchart illustrating a process where a base station determines an optimal transmission mode in a relay system according to an exemplary embodiment of the present invention.

FIG. 5 is a flowchart illustrating a process where a base station determines an optimal transmission mode in a relay system according to an exemplary embodiment of the present invention. Hereinafter, the process where the base station determines the optimal transmission mode will be described in detail with reference to FIG. 5.

In operation S510, the mobile station generates first channel state information with respect to a path from the base station to the mobile station. According to the present exemplary embodiment of the invention, the first channel state information may be generated based on a first pilot signal transmitted from the base station and received at the mobile station.

In operation S520, the base station receives, from the mobile station, the first channel state information generated at the mobile station.

In operation S530, the mobile station generates second channel state information with respect to a path from the relay to the mobile station. According to the present exemplary embodiment of the invention, the second channel state information may be generated based on a second pilot signal transmitted from the relay and received at the mobile station.

According to the present exemplary embodiment of the invention, the first pilot signal and the second pilot signal may be orthogonal to each other. Here, we assume that the first pilot signal and the second pilot signal are orthogonal to each other. In this case, even when the first pilot signal and the second pilot signal are simultaneously received at the mobile station, the mobile station receives individually the first pilot signal and the second pilot signal. As a result, each of the channel state information with respect to the path from the base station to the mobile station and the path from the relay to the mobile station may be generated.

According to another embodiment of the invention, the first pilot signal and the second pilot signal may be received at the mobile station during different time periods.

In operation S540, the base station receives, from the mobile station, the second channel state information generated at the mobile station.

In operation S550, the relay generates third channel state information with respect to a path from the base station to the relay. According to the present exemplary embodiment of the invention, the third channel state information may be generated based on a third pilot signal transmitted from the base station and received at the relay.

In operation S560, the base station receives, from the relay, the third channel state information generated at the relay.

In operation S570, the base station determines any one transmission mode out of a plurality of transmission modes as a second optimal transmission mode based on the first channel state information, the second channel state information, and the third channel state information which are received at the base station. According to the present exemplary embodiment of the invention, the base station may determine a transmission mode, in which the sum of a transmitted power at the base station and a transmitted power at the relay is at a minimum, out of a plurality of transmission modes as a second optimal transmission mode. At this time, the transmitted power is required to transmit data at a predetermined data transmission rate. According to another embodiment of the invention, the base station may determine a transmission mode, in which data is transmitted from the base station to the mobile station at a maximum data transmission rate, out of a plurality of transmission modes as an optimal transmission mode.

According to the present exemplary embodiment of the invention, the base station may determine at least one of three transmission modes described in FIGS. 2A, 2B, and 2C as an optimal transmission mode.

In operation S580, the base station may determine a modulation scheme and a channel encoding scheme of data which are transmitted from the base station to the relay, from the base station to the mobile station, and from the relay to the mobile station, respectively. Channel states of paths connecting the base station, the mobile station, and the relay vary over time, thus an optimal modulation scheme and an optimal channel encoding scheme for the varying channel states can also vary over time. Accordingly, when the base station determines an optimal modulation scheme and channel encoding scheme for the respective paths in consideration of the first channel state information, the second channel state information, and the third channel state information, and then the mobile station and the relay channel-encodes, decodes, modulates, and demodulates data according to the above-determined modulation scheme and the channel encoding scheme, the relay system of the present invention may transmit data with optimal performance. Also, the base station transmits the determined modulation scheme and the channel encoding scheme to the mobile station, thereby allowing the mobile station to appropriately receive data according to the determined modulation scheme and the channel encoding scheme.

According to the present exemplary embodiment of the invention, when the relay determines an optimal transmission mode of the relay system, a calculation process for determining the optimal transmission mode at the mobile station may be omitted. Specifically, when the mobile station determines the optimal transmission mode of the relay system, a data transmission rate or a transmission capacity of each path with respect to each transmission mode is required to be calculated. Also, since the calculations on the data transmission rate, the transmission capacity, and the like, at the mobile station operated by a battery are burdensome to be performed, a relay determining the optimal transmission mode is effective for reducing power consumption at the mobile station.

Figure 6:
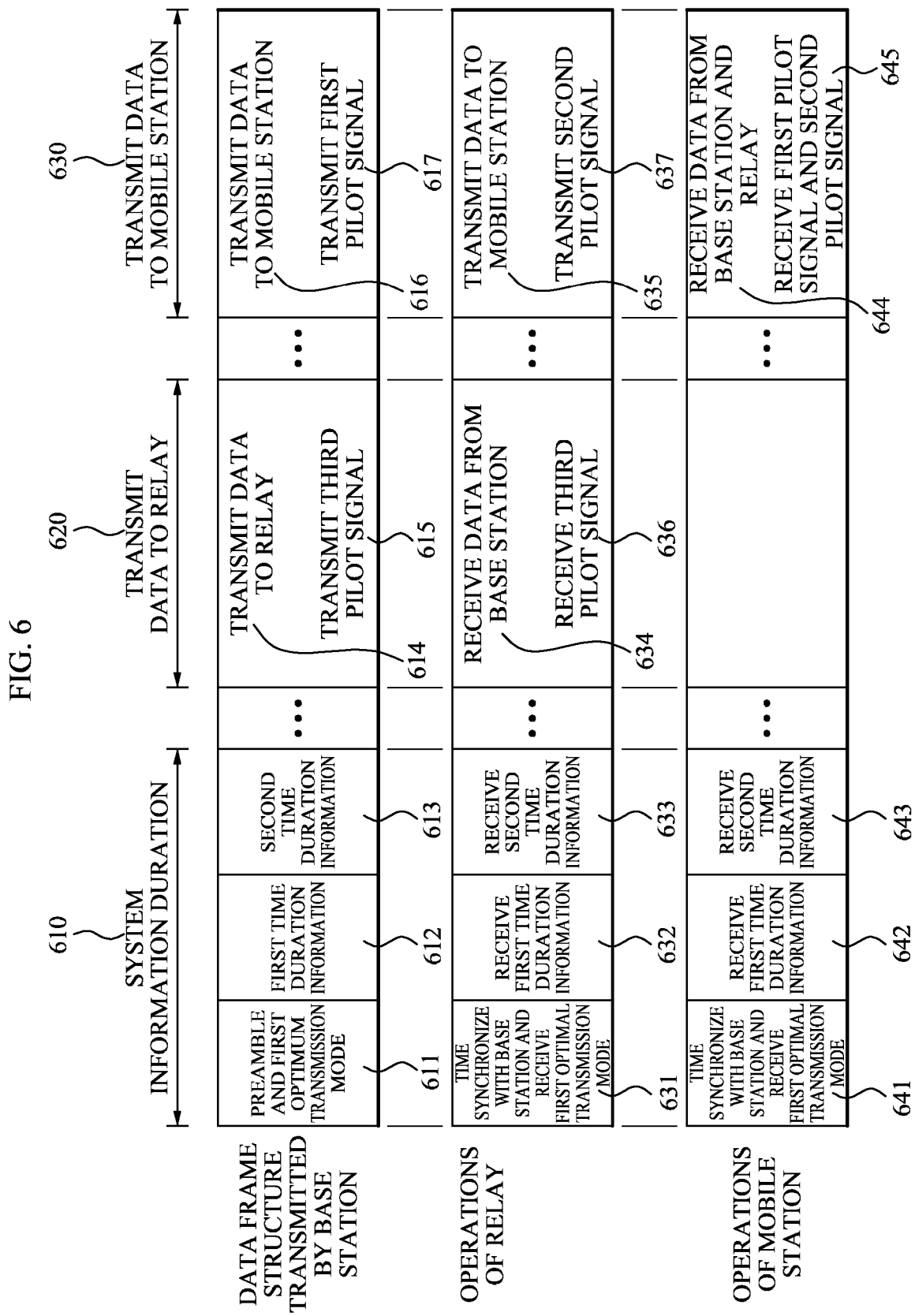
FIG. 6 is a diagram illustrating a data frame structure which is transmitted by a base station in order to determine an optimal transmission mode and transmit data utilizing the determined optimal transmission mode in a relay system, along with operations of a base station, a relay, and a mobile station, according to an exemplary embodiment of the present invention.

FIG. 6 is a diagram illustrating a data frame structure which is transmitted by a base station in order to determine an optimal transmission mode and transmit data utilizing the determined optimal transmission mode in a relay system, along with operations of a base station, a relay, and a mobile station, according to an exemplary embodiment of the present invention. The data frame structure according to the present exemplary embodiment of the invention includes a system information duration 610, a first time duration 620, and a second time duration 630. Hereinafter, the data frame structure will be described in detail with reference to FIG. 6.

The system information duration 610 may include a preamble and a first optimal transmission mode 611. Here, the preamble is a signal already known to the base station, the relay, and the mobile station. In operations 631 and 641, the relay and the mobile station included in the same relay system as the base station are time synchronized with the base station using the preamble.

The first optimal transmission mode 611 is a transmission mode which is optimal for transmitting a first data frame where the first optimal transmission mode is transmitted. As one of methods for transmitting data using the base station and the relay as described in FIGS. 2A, 2B, and 2C, according to the present exemplary embodiment of the invention, the first optimal transmission mode may be determined by the base station. Alternatively, the first optimal transmission mode may be determined by either the relay or the mobile station, and then transmitted to the base station.

When a transmission mode determined as the first optimal transmission mode is either a second transmission mode or a third transmission mode, the system information duration 610 may include first time duration information 612 and second time duration information 613.

The first time duration information 612 and the second time duration information 613 designate a start/end time of the first time duration and the second time duration, respectively, in the first data frame. The first time duration 620 and the second time duration 630 are set to be different from each other at every frame, and the relay and the mobile station included in the same relay system as the base station are informed of the set first and second time durations during the respective system information durations within every frame. As a result, an optimal transmission mode may be performed according to the channel states with respect to respective paths between base station, the relay, and the mobile station. In operations 631 and 641, the relay and the mobile station receive a first optimal transmission mode. Next, when the received first optimal transmission mode corresponds to either a second transmission mode or a third transmission mode, the relay and the mobile station receive first time duration information in operations 632 and 642, and receive second time duration information in operations 633 and 643, thereby receiving data according to the determined first optimal transmission mode.

According to the present exemplary embodiment of the invention, positions of the first time duration 620 and the second time duration 630 within the first data frame may be fixed, and the first time duration information 612 and the second time duration information 613 in the system information duration 610 may be omitted.

When the determined first optimal transmission mode is a first transmission mode, the base station transmits data to the mobile station using an entire time without distinguishing between the first time duration 620 and the second time duration 630.

According to the present exemplary embodiment of the invention, when the determined first optimal transmission mode is a second transmission mode, the base station transmits all data, which is required to be transmitted to the mobile station, to the relay during the first time duration 620 in operation 614, and also transmits all the data to the mobile station during the second time duration 630 in operation 616. In operations 634 and 635, the relay receives data from the base station during the first time duration 620, and transmits data to the mobile station during the second time duration 630, respectively. In operation 644, the mobile station receives data from the base station and the relay during the second time duration 630.

According to the present exemplary embodiment of the invention, when the determined first optimal transmission mode is a third transmission mode, the base station transmits a certain portion of data, which is required to be transmitted to the mobile station, to the relay during the first time duration 620 in operation 614, and transmits the remaining data to the mobile station during the second time duration 630 in operation 616. In operations 634 and 635, the relay receives data from the base station during the first time duration 620, and transmits data to the mobile station during the second time duration 630, respectively. In operation 644, the mobile station receives data from the base station and the relay during the second time duration 630.

According to the present exemplary embodiment of the invention, the base station may transmit a first pilot signal from the base station to the mobile station during the second time duration 630 in operation 617. The mobile station may receive the first pilot signal in operation 645, and then generate first channel state information with respect to a path from the base station to the mobile station.

According to the present exemplary embodiment of the invention, the relay may transmit a second pilot signal from the relay to the mobile station during the second time duration 630 in operation 637. The mobile station may receive the second pilot signal in operation 645, and then generate second channel state information with respect to a path from the relay to the mobile station.

According to the present exemplary embodiment of the invention, the base station may transmit a third pilot signal from the base station to the relay during the first time duration 620 in operation 615. The relay may receive the third pilot signal in operation 636, and then generate third channel state information with respect to a path from the base station to the relay.

According to the present exemplary embodiment of the invention, the first pilot signal and the second pilot signal may be orthogonal to each other. When the first pilot signal and the second pilot signal are orthogonal to each other, the mobile station may receive individually the first pilot signal and the second pilot signal in operation 645. The mobile station may generate channel state information with respect to respective paths based on the individually received pilot signals.

According to the present exemplary embodiment of the invention, the mobile station, the relay, and the base station may determine a second optimal transmission mode in consideration of the first channel state information, the second channel state information, and the third channel state information. The determined second optimal transmission mode is used as an optimal transmission mode for transmitting a second data frame which is transmitted after the first data frame.

Figure 7:
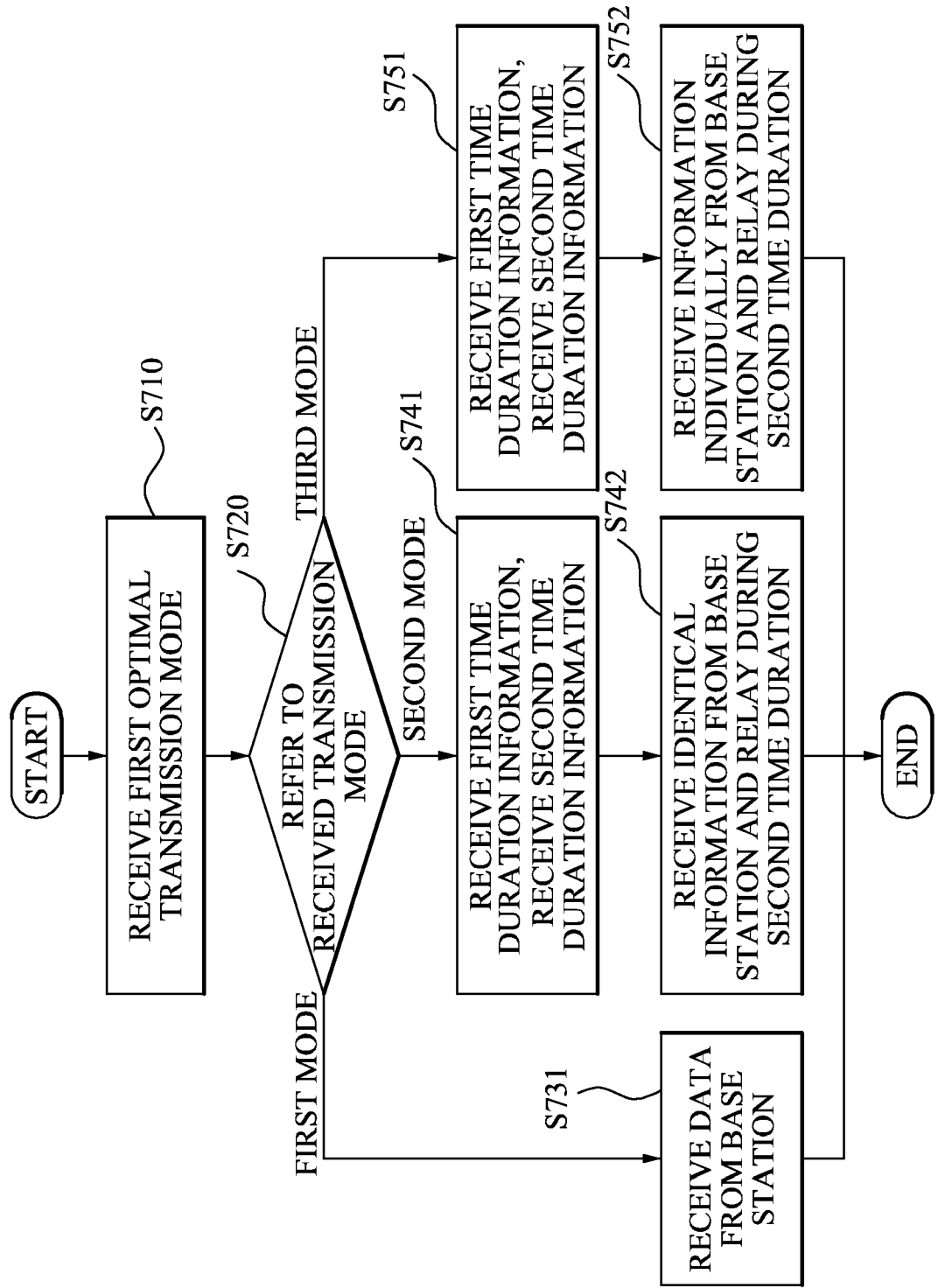
FIG. 7 is a flowchart illustrating a process where a mobile station receives data in a relay system according to an exemplary embodiment of the present invention.

FIG. 7 is a flowchart illustrating a process where a mobile station receives data in a relay system according to an exemplary embodiment of the present invention. Hereinafter, the process where the mobile station receives data will be described in detail with reference to FIG. 7.

In operation S710, the mobile station receives, from a base station, a first optimal transmission mode included in a first data frame. According to the present exemplary embodiment of the invention, the first optimal transmission mode may be determined to enable a transmitted power of the relay system to be at a minimum, and also enable a data transmission rate to be at a maximum.

According to the present exemplary embodiment of the invention, the first optimal transmission mode may include at least one of a first mode which directly transmits all data from the base station to the mobile station, a second mode which directly transmits all the data from the base station to the mobile station, and also transmits all the data from the base station to the mobile station via the relay, and a third mode which directly transmits a certain portion of all the data from the base station to the mobile station, and transmits remaining data from the base station to the mobile station via the relay.

The first optimal transmission mode may be an optimal transmission mode for transmitting the first data frame including the first optimal transmission mode.

In operation S720, the mobile station refers to the received first optimal transmission mode. When the received first optimal transmission mode is the first mode, the mobile station directly receives data from the base station in operation S731. Also, when the received first optimal transmission mode is the second mode, the mobile station additionally receives the first time duration information and the second time duration information in operation S741.

In operation S742, the mobile station receives information from the base station and the relay during the second time duration based on the second time duration information. At this time, the information from the base station and the relay is the same.

According to the present exemplary embodiment of the invention, the mobile station may receive a first pilot signal, transmitted from the base station, during the second time duration, and then generate first channel state information with respect to a path from the base station to the mobile station.

When the received first optimal transmission mode is the third mode, the mobile station additionally receives the first time duration information and the second time duration information in operation S751.

In operation S752, the mobile station receives information from the base station and the relay during the second time duration based on the second time duration information. At this time, the information from the base station and the relay is different from each other. According to the present exemplary embodiment, a certain portion of data from the base station to the mobile station may be received from the base station, and the remaining data may be received from the relay.

According to the present exemplary embodiment of the invention, the mobile station may receive the second pilot signal, transmitted from the relay, during the second time duration, and then generate second channel state information with respect to a path from the relay to the mobile station.

According to the present exemplary embodiment of the invention, the first pilot signal and the second pilot signal may be orthogonal to each other. When the first pilot signal and the second pilot signal are orthogonal to each other, the mobile station receives individually the first pilot signal and the second pilot signal while simultaneously receiving the first and second pilot signals. Thus, the mobile station may generate channel state information with respect to respective paths.

According to the present exemplary embodiment of the invention, the mobile station may transmit the first channel state information and the second channel state information to either the base station or the relay to enable either the base station or the relay to determine a second optimal transmission mode for transmitting the second data frame.

According to the present exemplary embodiment of the invention, the mobile station may receive, from the relay, the third channel state information with respect to the path from the base station to the relay, and then determine the second optimal transmission mode based on the first channel state information, the second channel state information, and the third channel state information. The determined second optimal transmission mode is used as an optimal transmission mode for transmitting the second data frame transmitted after the first data frame.

According to the present exemplary embodiment of the invention, the mobile station may transmit the determined second optimal transmission mode to the base station. The base station transmits data including information concerning the second optimal transmission mode during a system information duration of the second data frame, so that each of the relay and the mobile station can forward or receive the second data frame referring to the second optimal transmission mode.

According to the present exemplary embodiment of the invention, the mobile station may receive the second data frame referring to the determined second optimal transmission mode.

According to the present exemplary embodiment of the invention, the mobile station may receive at least one of a modulation scheme and a channel encoding scheme of data which is received during the system information duration of the data frame. The mobile station may receive data based on at least one of the received modulation scheme and the channel encoding scheme.

According to the present exemplary embodiment of the invention, the mobile station may receive data using a plurality of carrier waves. As an example of receiving data using the plurality of carrier waves, the mobile station may receive data using an Orthogonal Frequency Division Multiplexing (OFDM, hereinafter referred to as 'OFDM') scheme. In this case, the first optimal transmission mode transmitted by the base station, the modulation scheme, and the channel encoding scheme may be different for each of the plurality of carrier waves. The mobile station may receive data according to the first optimal transmitted mode, the modulation scheme, and the channel encoding scheme which are different for each of the plurality of carrier waves.

Figure 8:
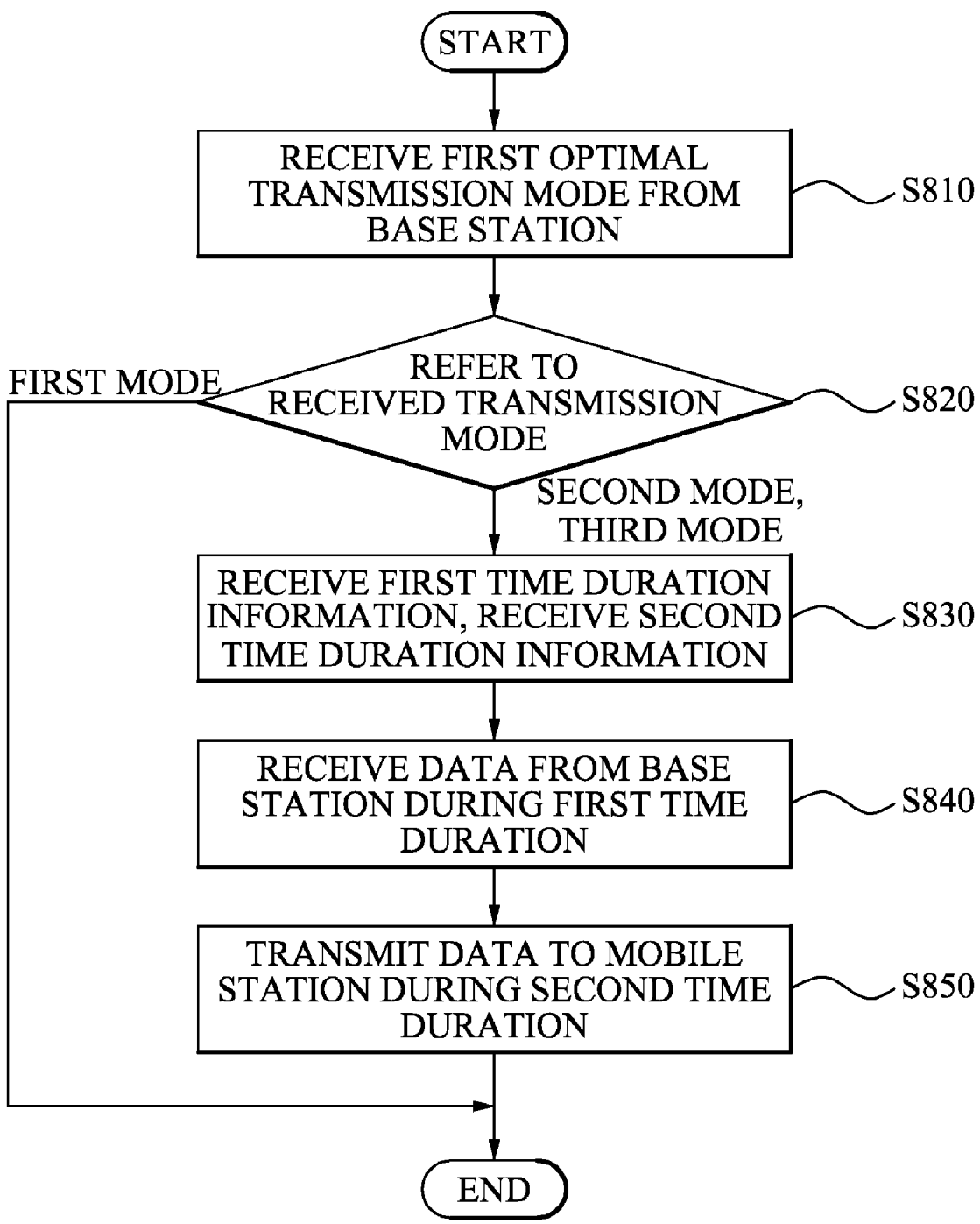
FIG. 8 is a flowchart illustrating a process where a relay forwards data in a relay system according to an exemplary embodiment of the present invention.

FIG. 8 is a flowchart illustrating a process where a relay forwards data in a relay system according to an exemplary embodiment of the present invention. Hereinafter, the process where the relay forwards data will be described in detail with reference to FIG. 8.

In operation S810, the relay receives, from the base station, the first optimal transmission mode included in the first data frame. According to the exemplary embodiment of the invention, the first optimal transmission mode may be determined to enable a transmitted power of the relay system to be at a minimum, and also enable a data transmission rate to be at a maximum.

According to the present exemplary embodiment of the invention, the first optimal transmission mode may include at least one of a first mode which directly transmits all data from the base station to the mobile station, a second mode which directly transmits all the data from the base station to the mobile station, and also transmits all the data from the base station to the mobile station via the relay, and a third mode which directly transmits a certain portion of all the data from the base station to the mobile station, and transmits remaining data from the base station to the mobile station via the relay.

In operation S820, the relay refers to the received first optimal transmission mode. When the received first optimal transmission mode is the first mode, data is directly transmitted from the base station to the mobile station.

When the received first optimal transmission mode is either the second mode or the third mode, the relay additionally receives the first time duration information and the second time duration information in operation S830.

In operation S840, the relay receives data from the base station during the first time duration. According to the present exemplary embodiment of the invention, when the first optimal transmission mode is the second mode, the data received from the base station is all the data to be transmitted from the base station to the mobile station, however, when the first optimal transmission mode is the third mode, the data received from the base station is a certain portion of all the data to be transmitted from the base station to the mobile station.

In operation S850, the relay transmits data to the mobile station during the second time duration.

According to the present exemplary embodiment of the invention, the relay may generate third channel state information with respect to a path from the base station to the relay based on a third pilot signal transmitted from the base station and received at the relay.

According to the present exemplary embodiment of the invention, the relay may transmit the third channel state information to the mobile station or the base station, so that the base station and the mobile station determine the second optimal transmission mode of the relay system in the second data frame.

According to the present exemplary embodiment of the invention, the relay may receive, from the mobile station, the first channel state information with respect to the path from the base station to the mobile station, and receive, from the relay, the second channel state information with respect to the path from the relay to the mobile station. Then, the relay may determine the second optimal transmission mode based on the first channel state information, the second channel state information, and the third channel state information. The determined second optimal transmission mode is used as an optimal transmission mode for transmitting the second data frame transmitted after the first data frame.

According to the present exemplary embodiment of the invention, the relay may transmit the determined second optimal transmission mode to the base station. The base station transmits data including information concerning the second optimal transmission mode during a system information duration of the second data frame, so that each of the relay and the mobile station can forward or receive the second data frame referring to the second optimal transmission mode.

According to the present exemplary embodiment of the invention, the relay may receive data from the base station referring the determined second optimal transmission mode, or forward the data to the mobile station.

According to the present exemplary embodiment of the invention, the relay may receive at least one of a modulation scheme of data to be received and a channel encoding scheme. The relay may receive and transmit data based on at least one of the modulation scheme and the channel encoding scheme.

According to the present exemplary embodiment of the invention, the relay may forward data using a plurality of carrier waves. As an example for forwarding data using the plurality of carrier waves, the relay may forward data using the OFDM scheme. In this case, the first optimal transmission mode transmitted by the base station, the modulation scheme, and the channel encoding scheme may be different for each of the plurality of carrier waves. The relay may forward data according to the first optimal transmission mode, the modulation scheme, and the channel encoding scheme which are different for each of the plurality of carrier waves.

Figure 9:
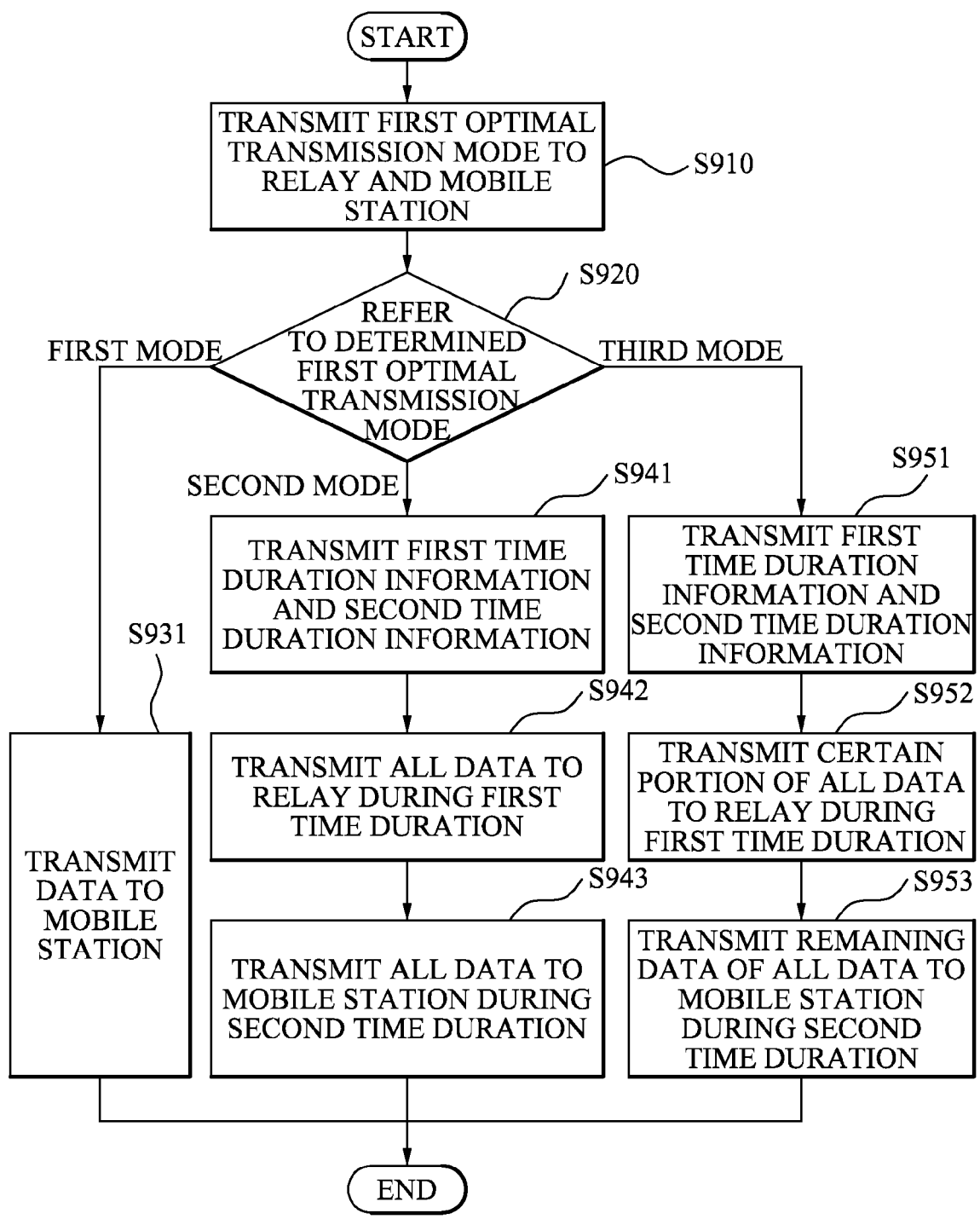
FIG. 9 is a flowchart illustrating a process where a base station transmits data in a relay system according to an exemplary embodiment of the present invention.

FIG. 9 is a flowchart illustrating a process where a base station transmits data in a relay system according to an exemplary embodiment of the present invention. Hereinafter, the process where the base station transmits data will be described in detail with reference to FIG. 9.

In operation S910, the base station transmits data including a first optimal transmission mode to the relay and the mobile station during the system information duration of the first data frame. According to the present exemplary embodiment of the invention, the first optimal transmission mode may be determined to enable a transmitted power of the relay system to be at a minimum, and also enable a data transmission rate to be at a maximum.

According to the present exemplary embodiment of the invention, the first optimal transmission mode may include at least one of a first mode which directly transmits all data from the base station to the mobile station; a second mode which directly transmits all the data from the base station to the mobile station, and also transmits all the data from the base station to the mobile station via the relay; and a third mode which directly transmits a certain portion of all the data from the base station to the mobile station, and transmits remaining data from the base station to the mobile station via the relay.

In operation S920, the base station refers to the determined first optimal transmission mode.

When the determined first optimal transmission mode is the first mode, data is directly transmitted from the base station to the mobile station in operation S931.

When the determined first optimal transmission mode is the second mode, the base station additionally transmits the first time duration information and the second time duration information in operation S941.

In operation S942, the base station transmits all data to be transmitted to the mobile station by the base station to the relay during the first time duration.

In operation S943, the base station transmits, to the mobile station, all data to be transmitted to the mobile station by the base station during the second time duration.

When the determined first optimal transmission mode is the third mode, the base station additionally transmits the first time duration information and the second time duration information in operation S951.

In operation S952, the base station transmits, to the relay, a certain portion of data to be transmitted to the mobile station by the base station during the first time duration.

In operation S953, the base station transmits the remaining data to be transmitted to the mobile station by the base station to the mobile station during the second time duration.

According to the present exemplary embodiment of the invention, the base station receives, from the mobile station, the first channel state information with respect to the path from the base station to the mobile station, and receives the second channel state information with respect to the path from the relay to the mobile station. Also, the base station receives the third channel state information with respect to the path from the base station to the relay. The base station may determine a second optimal transmission mode based on the received first channel state information, the second channel state information, and the third channel state information. The determined second optimal transmission mode is used as an optimal transmission mode for transmitting the second data frame transmitted after the first data frame.

According to the present exemplary embodiment of the invention, the base station transmits data including information concerning the second optimal transmission mode during the system information duration of the second data frame, so that each of the relay and the mobile station can forward or receive the second data frame referring to the second optimal transmission mode.

According to the present exemplary embodiment of the invention, the base station may determine at least one of a modulation scheme and a channel encoding scheme of data to be transmitted. The base station may transmit at least one of the determined modulation scheme and channel encoding scheme by enabling the modulation scheme and the channel encoding scheme to be included in the system information duration of the data frame to be transmitted to the relay and the mobile station.

According to the present exemplary embodiment of the invention, the base station may transmit data using a plurality of carrier waves. As an example for receiving data using the plurality of carrier waves, the base station may transmit data using the OFDM scheme. In this case, the first optimal transmission mode transmitted by the base station, the modulation scheme, and the channel encoding scheme may be different for each of the plurality of carrier waves. The base station may transmit data to the relay and the mobile station according to the first optimal transmitted mode, the modulation scheme, and the channel encoding scheme which are different for each of the plurality of carrier waves.

The method of determining an optimal transmission mode according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Figure 10:
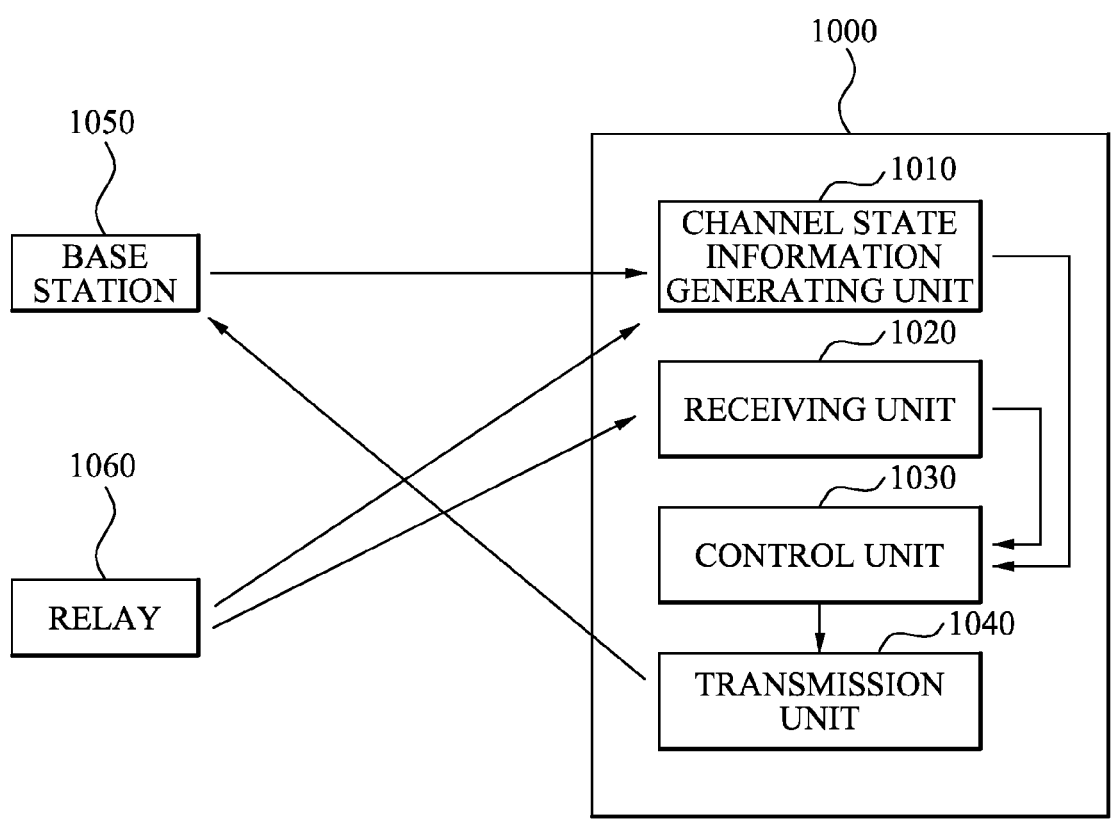
FIG. 10 is a block diagram illustrating a configuration of a mobile station that determines an optimal transmission mode for transmitting data from a base station to a mobile station in a relay system according to an exemplary embodiment of the present invention.

FIG. 10 is a block diagram illustrating a configuration of a mobile station that determines an optimal transmission mode for transmitting data from a base station 1050 to a mobile station 1000 in a relay system according to an exemplary embodiment of the present invention. As illustrated in FIG. 10, a mobile station 1000 includes a channel state information generating unit 1010, a receiving unit 1020, a control unit 1030, and a transmission unit 1040. Hereinafter, an operation of the mobile station according to the present exemplary embodiment of the invention will be described in detail with reference to FIG. 10.

The channel state information generating unit 1010 generates first channel state information with respect to a path from the base station 1050 to the mobile station 1000, and also generates second channel state information with respect to a path from a relay 1060 to the mobile station 1000. According to the present exemplary embodiment of the invention, the first channel state information may be generated based on a first pilot signal transmitted from the base station 1050 and received at the mobile station 1000. According to the present exemplary embodiment of the invention, the second channel state information may be generated based on a second pilot signal transmitted from the relay 1060 and received at the mobile station 1000.

The receiving unit 1020 receives, from the relay 1060, third channel state information with respect to a path from the base station 1050 to the relay 1060. According to the present exemplary embodiment of the invention, the third channel state information may be generated based on a third pilot signal transmitted from the base station 1050 and received at the relay 1060.

The control unit 1030 determines any one out of a plurality of transmission modes as an optimal transmission mode of the relay system based on the first channel state information, the second channel state information, and the third channel state information.

The transmission unit 1040 transmits the optimal transmission mode determined by the control unit 1030 to the base station 1050.

Figure 11:
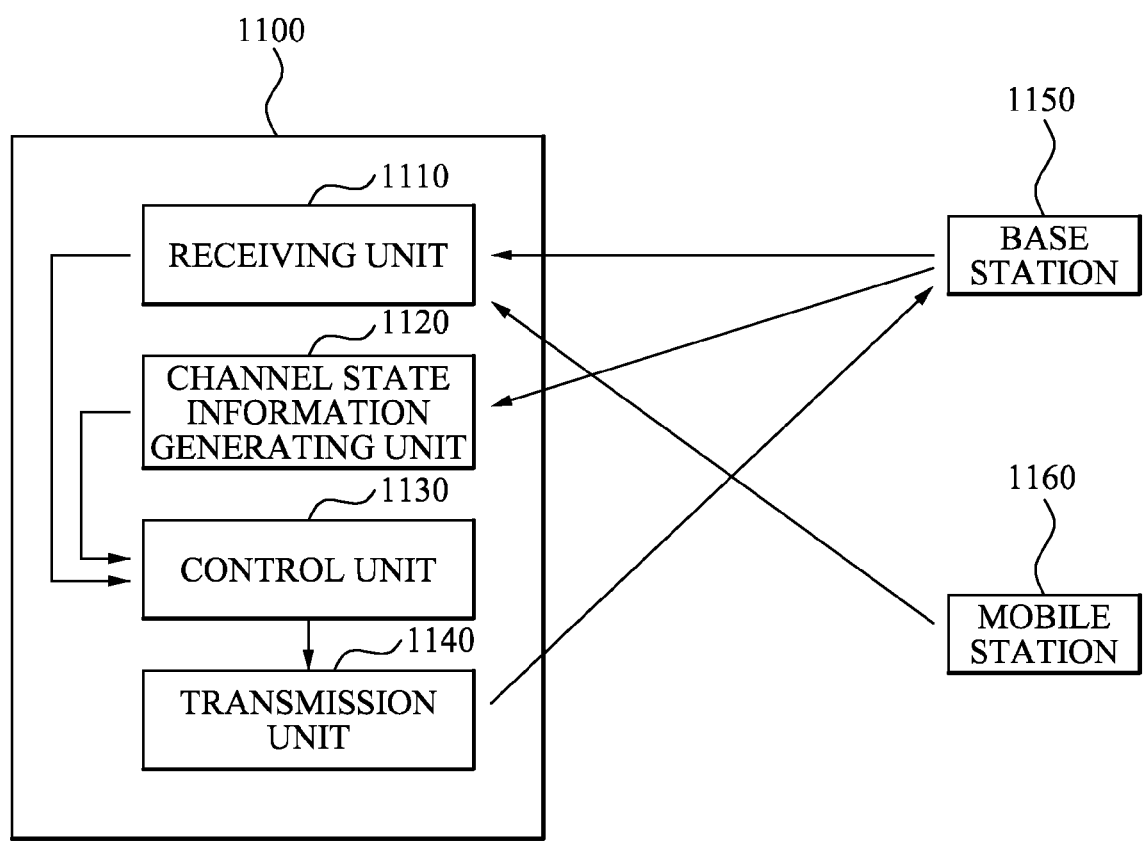
FIG. 11 is a block diagram illustrating a configuration of a relay that determines an optimal transmission mode for transmitting data from a base station to a mobile station in a relay system according to an exemplary embodiment of the present invention.

FIG. 11 is a block diagram illustrating a configuration of a relay 1100 that determines an optimal transmission mode for transmitting data from a base station 1150 to a mobile station 1160 in a relay system according to an exemplary embodiment of the present invention. As illustrated in FIG. 11, the relay 1100 includes a receiving unit 1110, a channel state information generating unit 1120, a control unit 1130, and a transmission unit 1140. Hereinafter, an operation of the relay according to the present exemplary embodiment of the invention will be described in detail with reference to FIG. 11.

The receiving unit 1110 receives, from the mobile station 1160, first channel state information with respect to a path from the base station 1150 to the mobile station 1160, and also receives, from the mobile station 1160, second channel state information with respect to a path from the relay 1100 to the mobile station 1160. According to the present exemplary embodiment of the invention, the first channel state information may be generated based on a first pilot signal transmitted from the base station 1150 and received at the mobile station 1160. According to the present exemplary embodiment of the invention, the second channel state information may be generated based on a second pilot signal transmitted from the relay 1100 and received at the mobile station 1160.

The channel state information generating unit 1120 generates third channel state information with respect to a path from the base station 1150 to the relay 1100. According to the present exemplary embodiment of the invention, the third channel state information may be generated based on a third pilot signal transmitted from the base station 1150 and received at the relay 1100.

The control unit 1130 determines any one out of a plurality of transmission modes as an optimal transmission mode of the relay system based on the first channel state information, the second channel state information, and the third channel state information.

The transmission unit 1140 transmits the optimal transmission mode determined by the control unit 1130 to the base station 1150.

Figure 12:
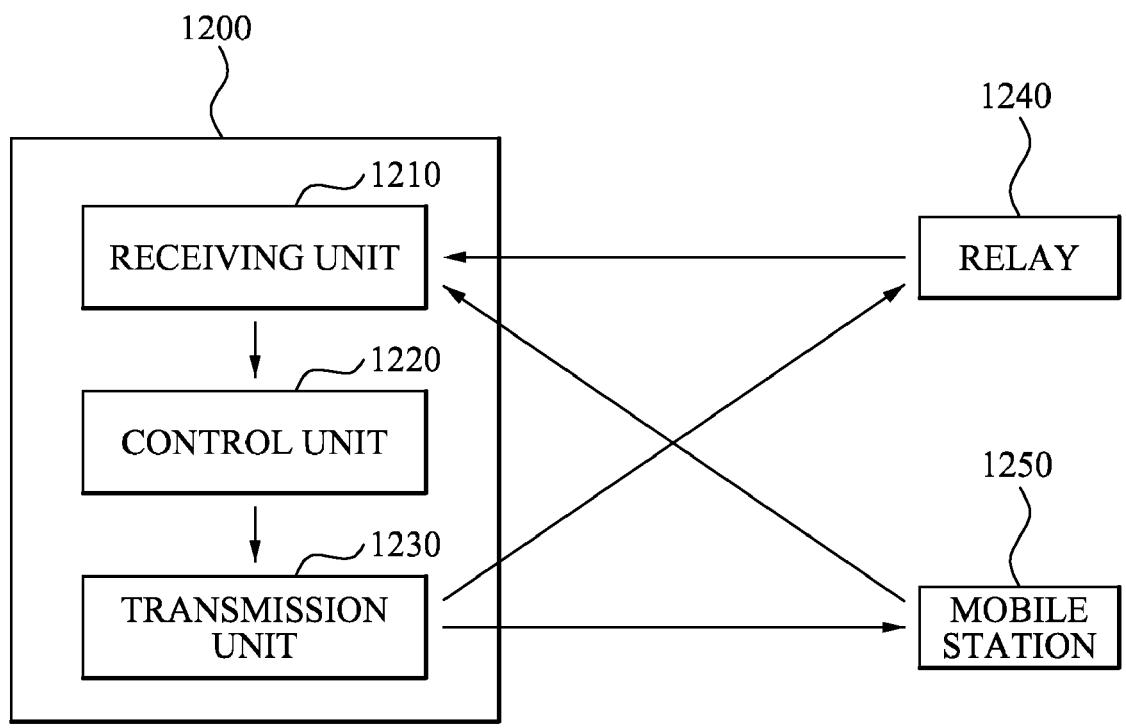
FIG. 12 is a block diagram illustrating a configuration of a base station device that determines an optimal transmission mode for transmitting data from a base station to a mobile station in a relay system according to an exemplary embodiment of the present invention.

FIG. 12 is a block diagram illustrating a configuration of a base station device 1200 that determines an optimal transmission mode for transmitting data from a base station to a mobile station 1250 in a relay system according to an exemplary embodiment of the present invention. As illustrated in FIG. 12, the base station device 1200 includes a receiving unit 1210, a control unit 1220, and a transmission unit 1230. Hereinafter, an operation of the base station device 1200 according to the present exemplary embodiment of the invention will be described in detail with reference to FIG. 12.

The receiving unit 1210 receives, from the mobile station 1250, first channel state information with respect to a path from the base station device 1200 to the mobile station 1250, receives, from the mobile station 1250, second channel state information with respect to a path from the relay 1240 to the mobile station 1250, and also receives, from the relay 1240, third channel state information with respect to a path from the base station device 1200 to the relay 1240. According to the present exemplary embodiment of the invention, the first channel state information may be generated based on a first pilot signal transmitted from the base station device 1200 and received at the mobile station 1250. According to the present exemplary embodiment of the invention, the second channel state information may be generated based on a second pilot signal transmitted from the relay 1240 and received at the mobile station 1250. According to the present exemplary embodiment of the invention, the third channel state information may be generated based on a third pilot signal transmitted from the base station device 1200 and received at the relay 1240.

The control unit 1220 determines any one out of a plurality of transmission modes as an optimal transmission mode of the relay system based on the first channel state information, the second channel state information, and the third channel state information.

The transmission unit 1230 transmits the optimal transmission mode determined by the control unit 1220 to the relay 1240 and the mobile station 1250.

Figure 13:
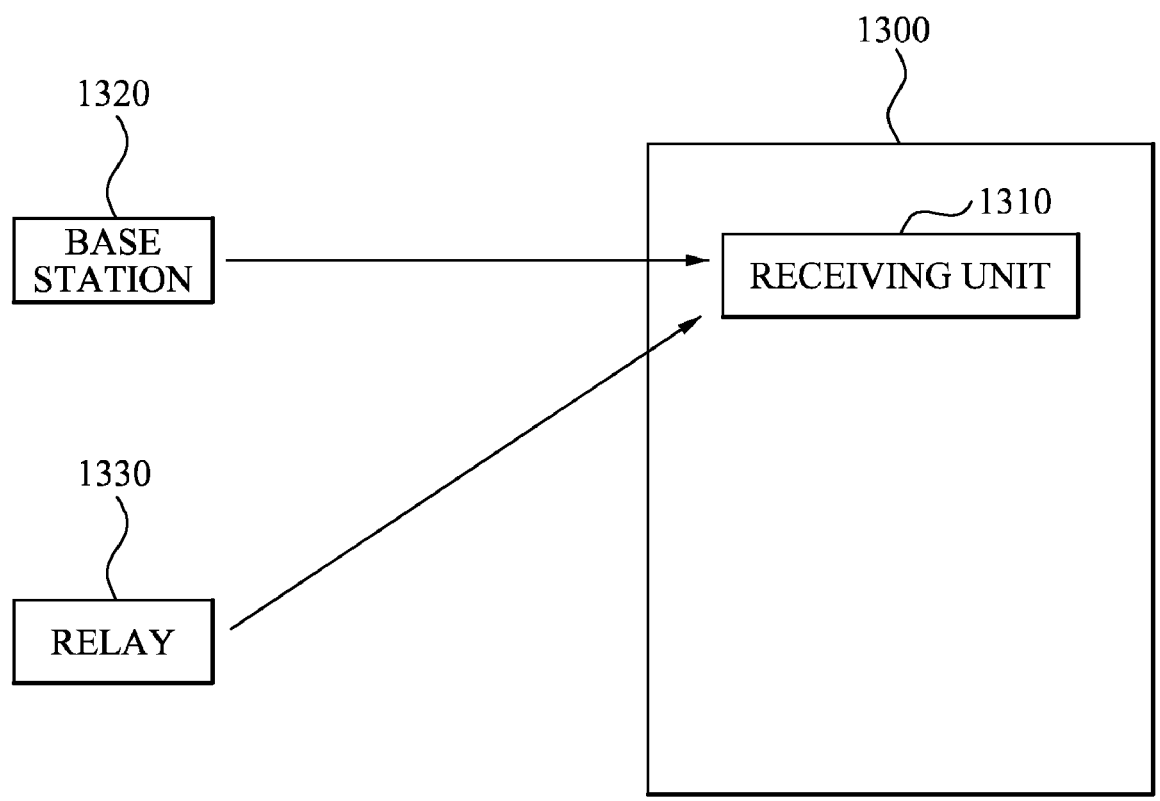
FIG. 13 is a block diagram illustrating a configuration of a mobile station that receives data from a base station via a relay in a relay system according to an exemplary embodiment of the present invention.

FIG. 13 is a block diagram illustrating a configuration of a mobile station 1300 that receives data from a base station 1320 via a relay 1330 in a relay system according to an exemplary embodiment of the present invention. As illustrated in FIG. 13, the mobile station 1300 includes a receiving unit 1310. Hereinafter, an operation of the mobile station 1300 according to the present exemplary embodiment of the invention will be described in detail with reference to FIG. 13.

The receiving unit 1310 receives, from a base station 1320, an optimal transmission mode determined out of a plurality of transmission modes, and also receives data referring to the received optimal transmission mode.

According to the present exemplary embodiment of the invention, the plurality of transmission modes may include at least one of a first mode which directly transmits all data from the base station 1320 to the mobile station 1300, a second mode which directly transmits all the data from the base station 1320 to the mobile station 1300, and also transmits all the data from the base station 1320 to the mobile station 1300 via the relay 1330, and a third mode which directly transmits a certain portion of all the data from the base station 1320 to the mobile station 1300, and transmits remaining data from the base station 1320 to the mobile station 1300 via the relay 1330.

According to the present exemplary embodiment of the invention, when the received optimal transmission mode is either the second mode or the third mode, the receiving unit 1310 may receive reception time duration information associated with the received optimal transmission mode, and also receive data either from the relay 1330 or the base station 1320 based on the received reception time duration information.

The configuration of the mobile station described in FIG. 13 may be used in the same manner as the method of determining the optimal transmission mode by the mobile station and the configuration of the method of receiving data described in FIGS. 3 and 7. Thus, the detailed descriptions will be omitted here.

Figure 14:
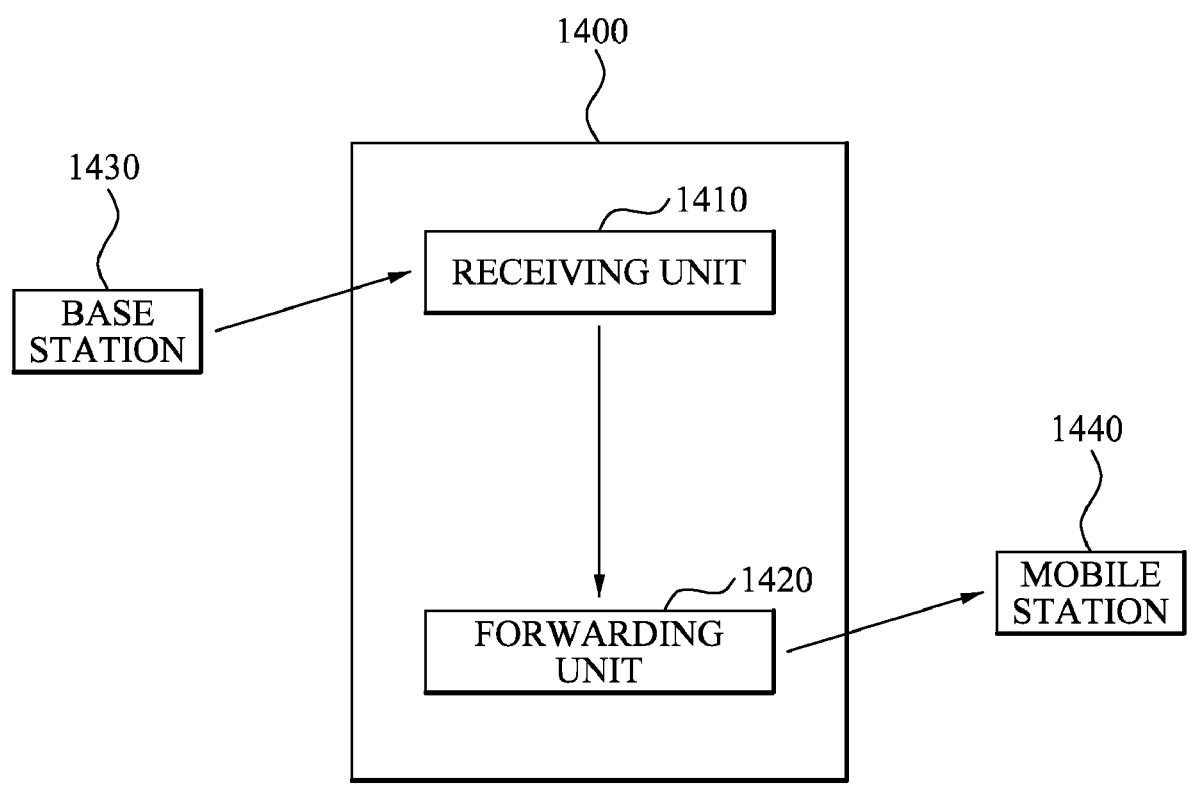
FIG. 14 is a block diagram illustrating a configuration of a relay that forwards data, received from a base station, to a mobile station in a relay system according to an exemplary embodiment of the present invention.

FIG. 14 is a block diagram illustrating a configuration of a relay 1400 that forwards data, received from a base station 1430, to a mobile station 1440 in a relay system according to an exemplary embodiment of the present invention. As illustrated in FIG. 14, the relay 1400 includes a receiving unit 1410 and a forwarding unit 1420. Hereinafter, an operation of the relay 1400 according to the present exemplary embodiment of the invention will be described in detail with reference to FIG. 14.

The receiving unit 1410 receives, from a base station 1430, an optimal transmission mode determined out of a plurality of transmission modes, and also receives data referring to the received optimal transmission mode.

According to the present exemplary embodiment of the invention, the plurality of transmission modes may include at least one of a first mode which directly transmits all data from the base station 1430 to the mobile station 1440, a second mode which directly transmits all the data from the base station 1430 to the mobile station 1440, and also transmits all the data from the base station 1430 to the mobile station 1440 via the relay 1400; and a third mode which directly transmits a certain portion of all the data from the base station 1430 to the mobile station 1440, and transmits remaining data from the base station 1430 to the mobile station 1440 via the relay 1400.

According to the present exemplary embodiment of the invention, when the received optimal transmission mode is either the second mode or the third mode, the receiving unit 1410 may receive first time duration information and second time duration information associated with the received optimal transmission mode. According to the present exemplary embodiment of the invention, the receiving unit 1410 may receive data from the base station 1430 based on the received first time duration information.

The forwarding unit 1420 forwards the received data to the mobile station 1440 referring to the received optimal transmission mode.

According to the present exemplary embodiment of the invention, when the optimal transmission mode received at the receiving unit 1410 is either the second mode or the third mode, the forwarding unit 1420 may forward data, received during the first time duration, to the mobile station 1440 based on the received second time duration information.

Figure 15:
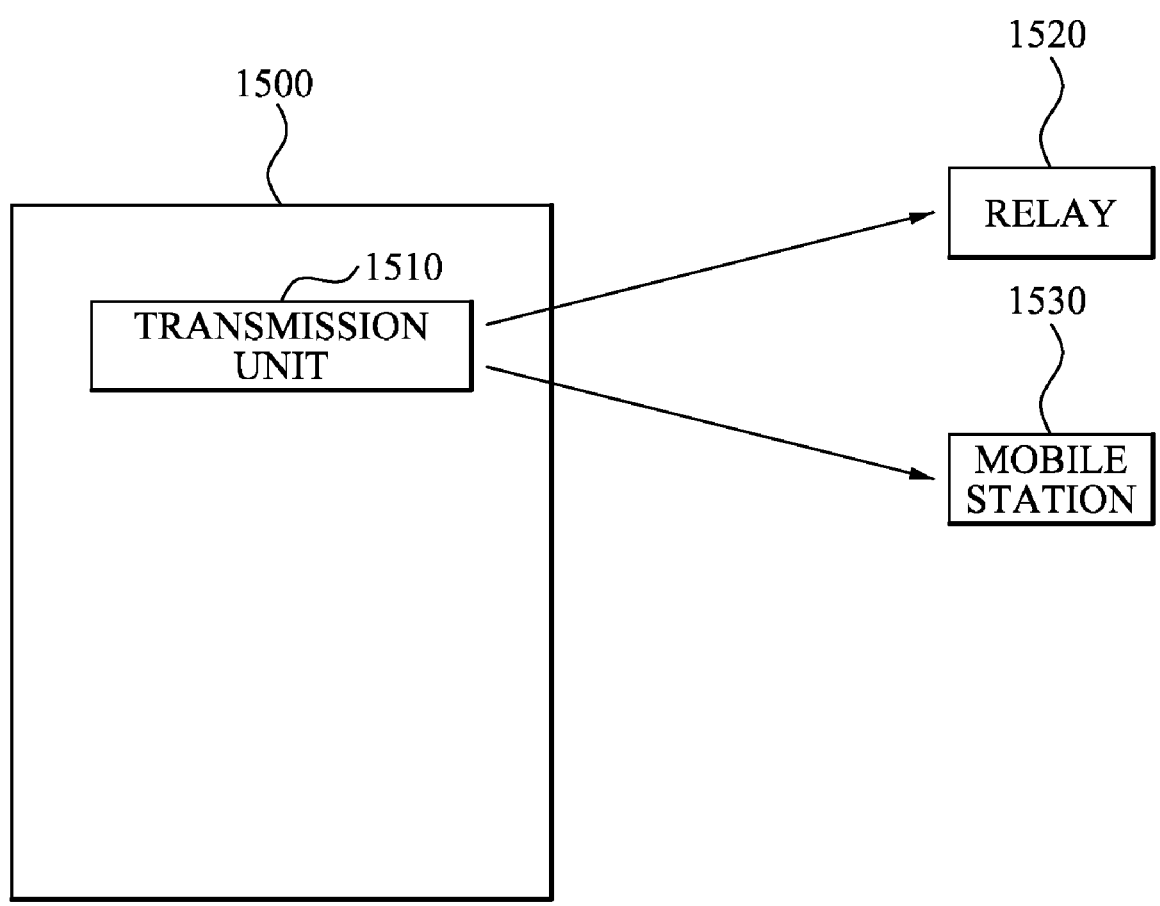
FIG. 15 is a block diagram illustrating a configuration of a base station device that transmits data to a mobile station via a relay in a relay system according to an exemplary embodiment of the present invention.

The configuration of the relay described in FIG. 15 may be used in the same manner as the method of determining the optimal transmission mode by the relay and the configuration of the method of forwarding data described in FIGS. 4 and 8. Thus, the detailed descriptions will be omitted here.

FIG. 15 is a block diagram illustrating a configuration of a base station device 1500 that transmits data to a mobile station 1530 via a relay 1520 in a relay system according to an exemplary embodiment of the present invention. As illustrated in FIG. 15, the base station device 1500 includes a transmission unit 1510. Hereinafter, an operation of the base station according to the present exemplary embodiment of the invention will be described in detail with reference to FIG. 15.

The transmission unit 1510 transmits an optimal transmission mode determined out of a plurality of transmission modes either to the relay 1520 or the mobile station 1530, and also transmits data referring to the transmitted optimal transmission mode.

According to the present exemplary embodiment of the invention, the plurality of transmission modes may include at least one of a first mode which directly transmits all data from the base station to the mobile station 1530, a second mode which directly transmits all the data from the base station to the mobile station 1530, and also transmits all the data from the base station to the mobile station 1530 via the relay 1520, and a third mode which directly transmits a certain portion of all the data from the base station to the mobile station 1530, and transmits remaining data from the base station to the mobile station 1530 via the relay 1520.

When the transmitted optimal transmission mode is either the second mode or the third mode, the transmission unit 1510 may transmit first time duration information and second time duration information associated with the transmitted optimal transmission mode.

Also, when the transmitted optimal transmission mode is either the second mode or the third mode, the transmission unit 1510 may transmit data referring to the first time duration information and the second time duration information.

The configuration of the base station described in FIG. 15 may be used in the same manner as the method of determining the optimal transmission mode by the base station and the configuration of the method of transmitting data described in FIGS. 5 and 10. Thus, the detailed descriptions will be omitted here.

As described above, in the data transmitting system using the relay according to the present invention, the mobile station may determine the optimal transmission mode for transmitting data.

In the data transmitting system using the relay according to the present invention, the relay may determine the optimal transmission mode for transmitting data.

In the data transmitting system using the relay according to the present invention, the base station may determine the optimal transmission mode for transmitting data.

In the data receiving system using the relay according to the present invention, data may be received using the frame structure for determining the optimal transmission mode.

In the data forwarding system using the relay according to the present invention, data may be forwarded using the frame structure for determining the optimal transmission mode.

In the data transmitting system using the relay according to the present invention, data may be transmitted using the frame structure for determining the optimal transmission mode.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of determining, by a mobile station, an optimal transmission mode for transmitting data from a base station to the mobile station, the method comprising:
generating first channel state information with respect to a path from the base station to the mobile station;
generating second channel state information with respect to a path from a relay to the mobile station;
receiving third channel state information with respect to a path from the base station to the relay; and
determining an optimal transmission mode from among a plurality of transmission modes based on the first channel state information, the second channel state information, and the third channel state information; and
transmitting the determined optimal transmission mode to the base station.

2. The method of claim 1, wherein:
the generating of the first channel state information generates the first channel state information based on a first pilot signal transmitted from the base station and received at the mobile station, and
the generating of the second channel state information generates the second channel state information based on a second pilot signal transmitted from the relay and received at the mobile station.

3. The method of claim 2, wherein the first pilot signal and the second pilot signal are orthogonal to each other.

4. The method of claim 1, further comprising:
determining at least one of a modulation scheme and a channel encoding scheme of the transmitted data with respect to the determined optimal transmission mode; and
transmitting at least one of the determined modulation scheme and the determined channel encoding scheme to the base station.

5. A method of determining, by a base station, an optimal transmission mode for transmitting data from the base station to a mobile station, the method comprising:
- receiving, from the mobile station, first channel state information with respect to a path from the base station to the mobile station;
- receiving, from the mobile station, second channel state information with respect to a path from a relay to the mobile station;
- receiving, from the relay, third channel state information with respect to a path from the base station to the relay;
- determining an optimal transmission mode from among a plurality of transmission modes based on the first channel state information, the second channel state information, and the third channel state information.

6. The method of claim 5, wherein:
- the receiving of the first channel state information receives the first channel state information generated based on a first pilot signal transmitted from the base station and received at the mobile station; and
- the receiving of the second channel state information receives the second channel state information generated based on a second pilot signal transmitted from the relay and received at the mobile station.

7. The method of claim 6, wherein the first pilot signal and the second pilot signal are orthogonal to each other.

8. The method of claim 5, further comprising:
- determining at least one of a modulation scheme and a channel encoding scheme of the transmitted data with respect to the determined optimal transmission mode.

9. A method of receiving, by a mobile station, data from a base station via a relay, the method comprising:
- receiving, from the base station, an optimal transmission mode determined from among a plurality of transmission modes; and
- receiving a first data frame utilizing the received optimal transmission mode,
- wherein the plurality of transmission modes comprises at least one of:
- a first mode which directly transmits all data from the base station to the mobile station;
- a second mode which directly transmits all the data from the base station to the mobile station, and also transmits all the data from the base station to the mobile station via the relay; and
- a third mode which directly transmits a certain portion of all the data from the base station to the mobile station, and transmits remaining data from the base station to the mobile station via the relay,
- wherein when the received optimal transmission mode corresponds to either the second mode or the third mode, the method further comprises receiving reception time duration information associated with the received optimal transmission mode, and
- the receiving of the first data frame receives the first data frame from the relay or the base station based on the received reception time duration information.

10. The method of claim 9, further comprising:
- generating first channel state information with respect to a path from the base station to the mobile station; and
- generating second channel state information with respect to a path from the relay to the mobile station.

11. The method of claim 10, wherein:
- the generating of the first channel state information generates the first channel state information based on a first pilot signal received from the base station, and
- the generating of the second channel state information generates the second channel state information based on a second pilot signal received from the relay.

12. The method of claim 11, wherein the first pilot signal and the second pilot signal are orthogonal to each other.

13. The method of claim 9, further comprising:
- receiving, from the relay, third channel state information with respect to a path from the base station to the relay;
- determining a second optimal transmission mode based on the first channel state information, the second channel state information, and the third channel state information;
- transmitting the determined second optimal transmission mode to the base station; and
- receiving a second data frame utilizing the second optimal transmission mode.

14. The method of claim 11, further comprising transmitting at least one of the generated first channel state information and the generated second channel state information to the base station or the relay.

15. The method of claim 9, wherein:
- the receiving of the optimal transmission mode further comprises receiving at least one of a modulation scheme and a channel encoding scheme of data included in the received first data frame, and
- the receiving of the first data frame receives the first data frame based on at least one of the received modulation scheme and the received channel encoding scheme.

16. A method of forwarding, by a relay, data received from a base station, to a mobile station, the method comprising:
- receiving, from the base station, an optimal transmission mode determined from among a plurality of transmission modes;
- receiving a first data frame utilizing the received optimal transmission mode; and
- forwarding the received first data frame to a mobile station utilizing the received optimal transmission mode,
- wherein the plurality of transmission modes comprises at least one of:
- a first mode which directly transmits all data from the base station to the mobile station;
- a second mode which directly transmits all the data from the base station to the mobile station, and also transmits all the data from the base station to the mobile station via the relay; and
- a third mode which directly transmits a certain portion of all the data from the base station to the mobile station, and transmits remaining data from the base station to the mobile station via the relay,
- wherein when the received optimal transmission mode corresponds to either the second mode or the third mode, the method further comprises receiving first time duration information and second time duration information associated with the received optimal transmission mode,
- wherein the receiving of the first data frame receives the first data frame from the base station based on the received first time duration information, and
- the forwarding of the first data frame forwards the first data frame, received during the first time duration, to the mobile station based on the received second time duration information.

17. The method of claim 16, further comprising generating third channel state information with respect to a path from the base station to the relay.

18. The method of claim 17, further comprising:
receiving, from the mobile station, first channel state information with respect to a path from the base station to the mobile station;
receiving, from the mobile station, second channel state information with respect to a path from the relay to the mobile station;
determining a second optimal transmission mode based on the first channel state information, the second channel state information, and the third channel state information;
transmitting the determined second optimal transmission mode to the base station; and
receiving a second data frame utilizing the second optimal transmission mode.

19. The method of claim 17, further comprising transmitting the generated third channel state information to at least one of the base station and the mobile station.

20. The method of claim 16, wherein:
the receiving of the optimal transmission mode further comprises receiving at least one of a modulation scheme and a channel encoding scheme of data included in the first data frame, received from the base station, or receiving at least one of a modulation scheme and a channel encoding scheme of data included in the first data frame, forwarded to the mobile station,
the receiving of the first data frame receives the first data frame based on at least one of the modulation scheme of data included in the first data frame, received from the base station, and the channel encoding scheme of data included in the first data frame, received from the base station, and
the forwarding of the first data frame forwards the first data frame based on at least one of the modulation scheme of data included in the first data frame, forwarded to the mobile station, and the channel encoding scheme of data included in the first data frame, forwarded to the mobile station.

21. A method of transmitting, by a base station, data to a mobile station, the method comprising:
transmitting a first optimal transmission mode determined from among a plurality of transmission modes to a relay or the mobile station; and
transmitting a first data frame utilizing the transmitted optimal transmission mode,
wherein the plurality of transmission modes comprises at least one of:
a first mode which directly transmits all data from the base station to the mobile station;
a second mode which directly transmits all the data from the base station to the mobile station, and also transmits all the data from the base station to the mobile station via the relay; and
a third mode which directly transmits a certain portion of all the data from the base station to the mobile station, and transmits remaining data from the base station to the mobile station via the relay,
wherein, when the transmitted optimal transmission mode corresponds to either the second mode or the third mode, the method further comprises transmitting first time duration information and second time duration information associated with the transmitted optimal transmission mode, and
the transmitting of the first data frame transmits data utilizing the first time duration information and the second time duration information.

22. The method of claim 21, wherein, when the transmitted optimal transmission mode corresponds to the second transmission mode, the transmitting of the first data frame transmits all the data to the relay during the first time duration, and all the data to the mobile station during the second time duration.

23. The method of claim 21, wherein, when the transmitted optimal transmission mode corresponds to the third transmission mode, the transmitting of the data transmits remaining data of the data to the relay during the first time duration, and a certain portion of the data to the mobile station during the second time duration.

24. The method of claim 21, further comprising:
receiving first channel state information with respect to a path from the base station to the mobile station;
receiving second channel state information with respect to a path from the relay to the mobile station;
receiving third channel state information with respect to a path from the base station to the relay;
determining a second optimal transmission mode based on the first channel state information, the second channel state information, and the third channel state information;
transmitting the determined second optimal transmission mode to the relay and the mobile station; and
transmitting a second data frame utilizing the transmitted second optimal transmission mode.

25. The method of claim 21, wherein:
the transmitting of the first optimal transmission mode further comprises transmitting at least one of a modulation scheme and a channel encoding scheme of data included in the transmitted first data frame, and
the transmitting of the first data frame transmits the data based on at least one of the transmitted modulation scheme and the channel encoding scheme.

* * * * *